United States Patent [19]
Whittaker

[11] Patent Number: 6,155,369
[45] Date of Patent: Dec. 5, 2000

[54] ELECTRIC BICYCLE

[76] Inventor: Ronald W. Whittaker, 4526 Eastwood, Okemos, Mich. 48864

[21] Appl. No.: 09/048,551

[22] Filed: Mar. 26, 1998

[51] Int. Cl.⁷ .............................. B62D 61/02; B62D 11/00
[52] U.S. Cl. .......................... 180/220; 180/205; 180/65.1
[58] Field of Search ..................................... 180/219, 220, 180/205, 206, 207, 223, 65.1, 65.2, 65.3, 65.6, 65.8, 231, 230; 192/105 A, 105 BA, 103 B, 105 BB

[56] References Cited

U.S. PATENT DOCUMENTS

| | | |
|---|---|---|
| 596,274 | 12/1897 | Libbey . |
| 656,323 | 8/1900 | Hansel . |
| 1,832,018 | 11/1931 | Gossard . |
| 2,397,115 | 3/1946 | Argyris . |
| 2,457,430 | 12/1948 | Argyris . |
| 2,923,365 | 2/1960 | McKechnie . |
| 3,173,528 | 3/1965 | Mennesson . |
| 3,431,994 | 3/1969 | Wood, Jr. . |
| 3,533,484 | 10/1970 | Wood, Jr. . |
| 3,693,771 | 9/1972 | De Lancey ........................... 192/103 B |
| 3,800,898 | 4/1974 | Griffin . |
| 3,921,741 | 11/1975 | Garfinkle et al. ....................... 180/205 |
| 3,921,745 | 11/1975 | McCulloch et al. .................... 180/205 |
| 4,410,060 | 10/1983 | Cunard . |
| 4,878,554 | 11/1989 | Dion . |
| 5,237,263 | 8/1993 | Gannon .................................. 180/205 |
| 5,267,767 | 12/1993 | Farrow .................................. 296/78.1 |
| 5,934,401 | 8/1999 | Mayer ..................................... 180/220 |

*Primary Examiner*—Anne Marie Boehler
*Attorney, Agent, or Firm*—George P. Pappas, Attorney

[57] ABSTRACT

An electric bicycle assembly provided with a lightweight, high performance DC electric motor and a tuned centrifugal slip clutch assembly in combination therewith. This bicycle assembly includes a two-stage start-run electric control circuitry which prevents high motor zero rpm in-rush currents which may damage the motor. Another embodiment of this invention utilizes a variable ratio V-belt drive assembly having a centrifugal clutch capability so as to engage and disengage at a predetermined RPM. Another embodiment of this invention is provided with a front wheel mounted regenerating wheel rotor assembly which is adapted to recharge batteries as needed. Another embodiment of this invention utilizes a mechanically actuated multi-stage power control switch so as to selectively provide a start circuit and two or more power control levels in the operational use thereof.

8 Claims, 23 Drawing Sheets

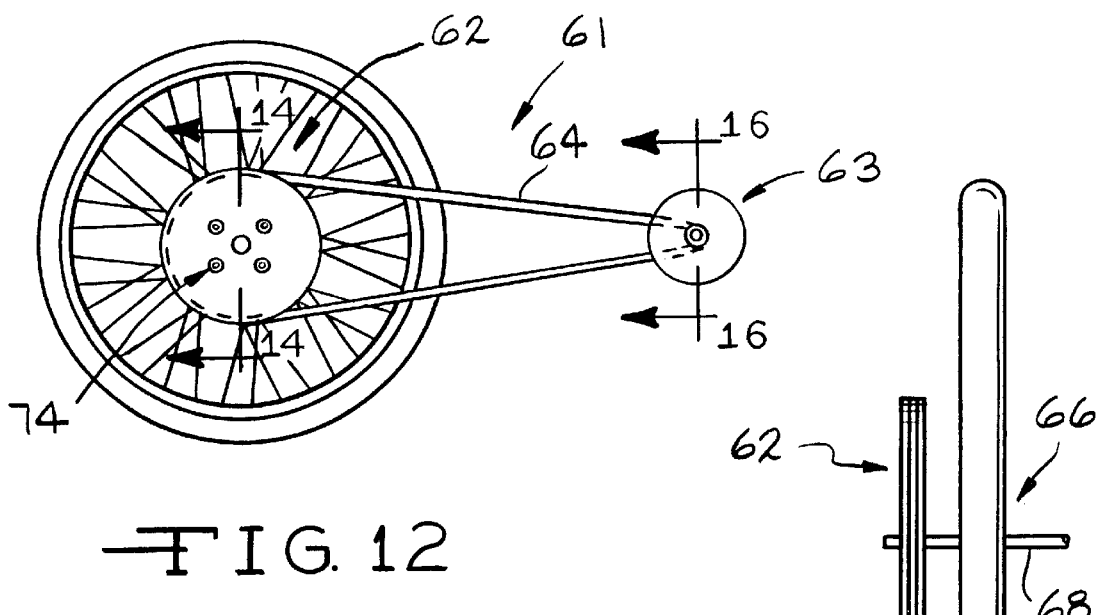
FIG. 12
FIG. 12A
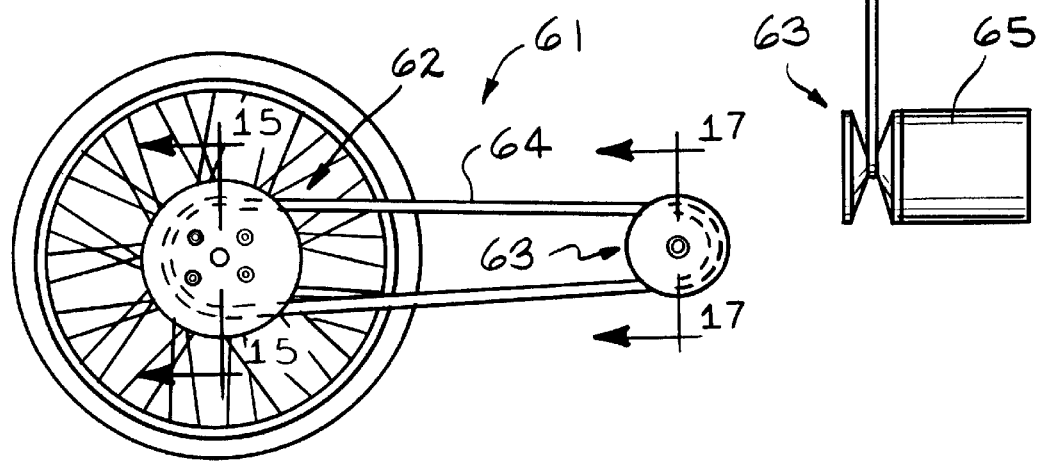
FIG. 13

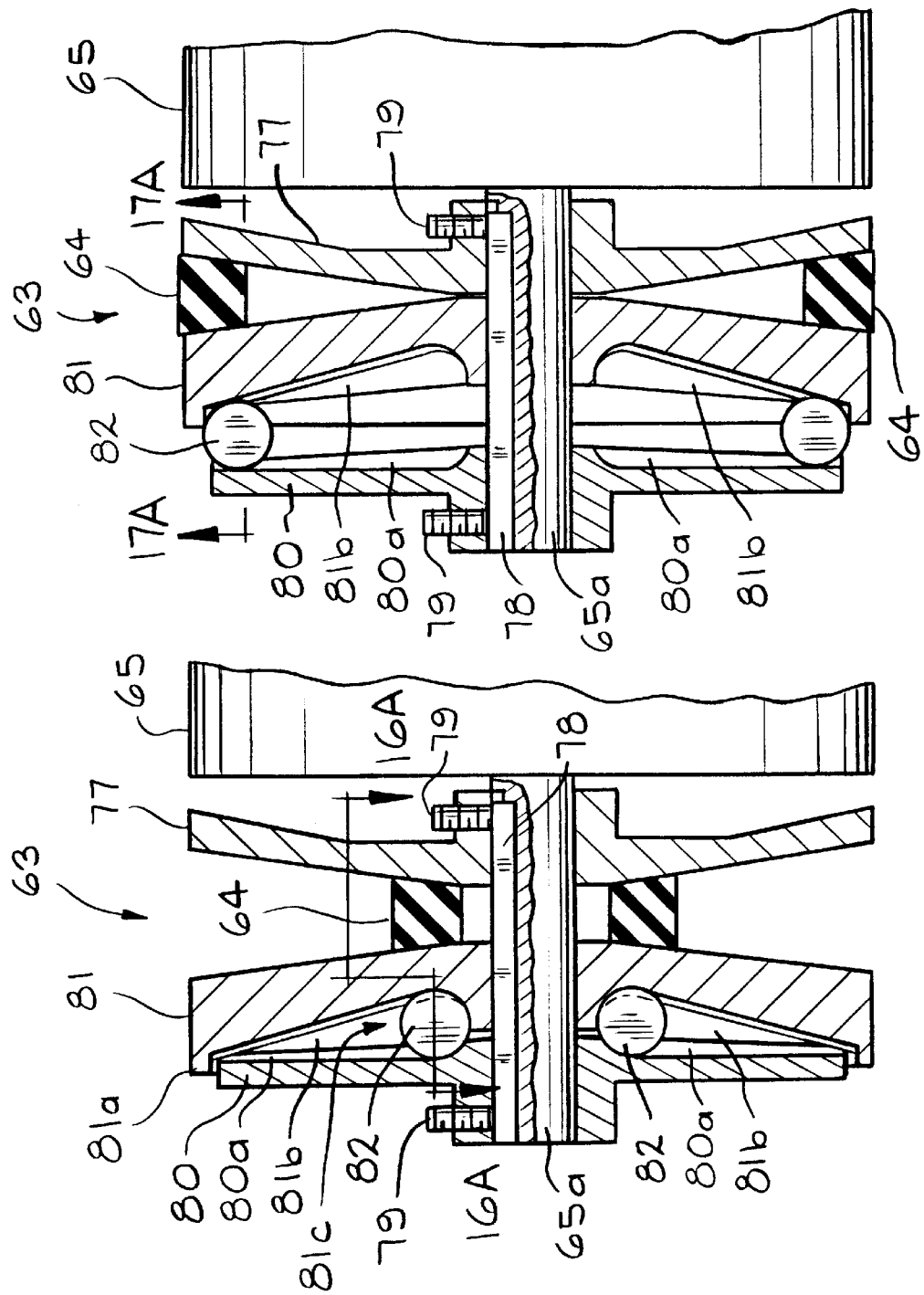

ELECTRIC BICYCLE

This invention relates to an electric bicycle assembly which is simple in design configuration so as to achieve a cruising speed of 25+ mph and a range of 45+ miles while remaining highly efficient and cost effective.

This invention relates to an electric bicycle assembly having a lightweight, high performance DC electric motor and a tuned centrifugal slip clutch in combination therewith which results in a single stage gear reduction having improved efficiency over multi-stage gear reduction by reducing overall mechanical friction which wastes energy.

Still further, this invention relates to an electric bicycle assembly having a tuned centrifugal slip clutch which is tuned to lock up at approximately 50% of peak rpm so as to prevent the high efficiency motor from trying to start moving the bicycle at zero or low rpm with an immediate resultant high current drain of the battery.

This invention also relates to an electric bicycle assembly having a tuned centrifugal slip clutch which prevents a dramatic lurch forward by the bicycle when the start-run button is engaged.

Further, this invention relates to an electric bicycle assembly which utilizes a lightweight high performance DC electric motor having an 80% or better efficiency so as to improve performance and achieve an extended range.

This invention further relates to an electric bicycle assembly having a two-stage start run control circuitry which prevents high motor zero rpm in rush currents that can damage motor magnets and other components. The two-stage start run control circuitry prevents the high current rate drainage of the batteries so as to increase the operating range and efficiency of the electric bicycle.

This invention also relates to an electric bicycle assembly having embodiments which utilize three batteries to provide a 36-volt system as opposed to a lower voltage system. The higher voltage system permits the utilization of lighter motors, wiring and less expensive motor feed wiring and a higher voltage motor which provides the same horsepower while having a higher efficiency and less weight than a lower voltage motor.

This invention also relates to an electric bicycle assembly which does not use energy wasting rheostats and voltage dropping resistors and/or expensive solid state controllers to attempt to avoid a high current zero rpm start-up problem which can result in high current rate battery drain and also result in premature motor failure.

This invention also relates to an electric bicycle assembly wherein the driving power is applied directly into a standard multi-speed bicycle rear hub so that a wide range of gears becomes available in a simple, lightweight efficient package.

Another embodiment of this invention relates to a hybrid electric bicycle assembly which utilizes a standard bicycle pedal rear wheel drive which selectively coacts with a front wheel mounted electric motor and tuned centrifugal clutch drive assembly embodied in the present invention.

A still further embodiment of this invention relates to an electric bicycle assembly as described herein which is provided with an aerodynamic faring or an enclosed or semi-enclosed aerodynamic cab which can be covered with photovoltaic cells adapted to charge the batteries so as to enhance the battery charge thereby increasing the range of the bicycle before a full battery charge is required.

Yet another embodiment of this invention relates to an electric bicycle assembly which is selectively provided with a solar panel adapted to charge the batteries thereby recharging the batteries without a readily available electric source.

A still further embodiment of this invention relates to an electric bicycle assembly which is selectively provided with a battery charger assembly which can be plugged into a 110 volt outlet so as to recharge the batteries while the electric bicycle is not in use.

Another embodiment of this invention relates to a tricycle assembly which utilizes one or more of the foregoing embodiments in providing a front or rear wheel drive tricycle assembly.

Yet another embodiment of this invention relates to a four-wheel electric vehicle which utilizes one or more of the foregoing embodiments to provide a front or rear wheel drive assembly.

Another embodiment of this invention relates to an electric bicycle assembly which utilizes a variable ratio V-belt drive assembly having a centrifugal clutch capability so as to engage and disengage at a predetermined RPM.

Another embodiment of this invention relates to an electric bicycle assembly which utilizes a front wheel mounted regenerating wheel rotor assembly which is adapted to recharge the batteries as needed while braking when the electric bicycle is in motion.

Another embodiment of this invention relates to an electric bicycle assembly which utilizes a mechanically actuated multi-stage power control switch so as to selectively provide a start circuit and two or more power control levels in the operational use thereof.

None of the electric bicycle assemblies of the prior known art teach the unique configuration of the present invention which utilizes electric bicycle or tricycle assembly components as described herein to provide improved speeds and extended range.

Other objects and advantages found in the construction of the invention will be apparent from a consideration in connection with the appended claims and the accompanying drawings.

IN THE DRAWINGS

FIG. 12 is a schematic partial right side view of the variable ratio V-belt drive assembly embodiment shown in its zero rpm position.

FIG. 12A is a schematic top view of the variable ratio V-belt drive assembly shown in FIG. 12.

FIG. 13 is a schematic partial right side view of the variable ratio V-belt drive assembly embodiment shown in its full rpm position.

FIG. 16 is a schematic partial cross-sectional view of the variable ratio V-belt drive assembly embodiment taken on line 16—16 of FIG. 12.

FIG. 17 is a schematic partial cross-sectional view of the variable ratio V-belt drive assembly embodiment taken on line 17—17 of FIG. 13.

DESCRIPTION

Figure 1:
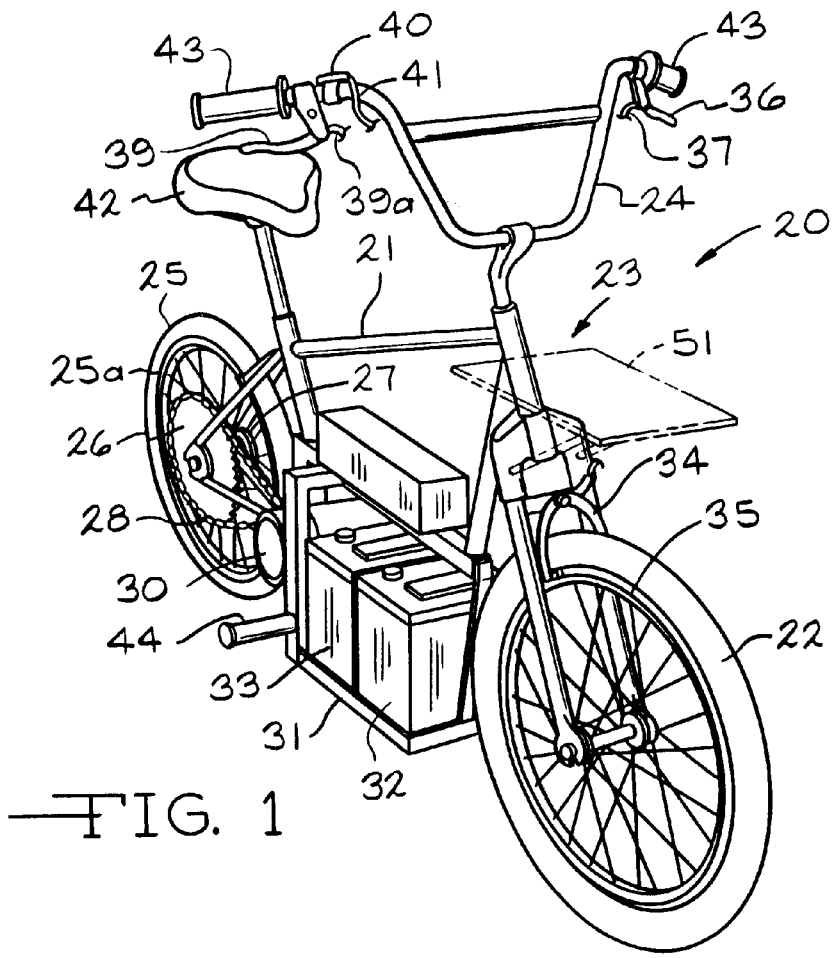
FIG. 1 is a schematic perspective view showing the right side of the electric bicycle.

An embodiment of the electric bicycle 20 is shown in the right side schematic perspective view of FIG. 1. The electric bicycle 20 is comprised of frame 21 having a front wheel 22 mounted in a fork assembly 23 which is stearable by a handle bar assembly 24.

A rear wheel 25 is mounted at the rear of the frame 21 and is provided with a drive sprocket 26 operatively connected to the multi-speed drive hub 27 of the rear wheel 25.

The drive sprocket 26 is driven by a drive chain 28 which is in operative engagement with a high performance DC electric motor 29 in combination with a selectively tuned centrifugal slip clutch assembly 30. The overall operation of the DC electric motor 29 and the selectively tuned centrifugal clutch 30 will be discussed hereafter in greater detail as shown in FIGS. 4, 4A, 6 and 7.

A battery support cage 31 is suspended from the frame 21 so as to support the batteries 32 and 33 respectively which selectively power the DC motor 29. As will be hereinafter discussed, other embodiments of the electric bicycle invention utilize three batteries so as to achieve greater range and versatility. It is within the scope of this invention to utilize a single battery to power the DC motor 29.

It should also be noted that a ½ hp electric bicycle with two 33 amp hour gel cell lead acid batteries will store approximately 900 watts of electrical power which costs approximately 7 cents at 8 cents per KWH. The 7 cents of power will propel the bike 35+ miles at 21 mph. One cent (1¢) of electricity will power the bicycle for 5+ miles on average. Each mile will consume 23 watts of electricity at 21 mph.

Further, the ¾ hp bicycle with three 33 amp hour gel cell lead acid batteries will store aproximately 1300+ watts of electrical power which costs approximately 11 cents at 8 cents per KWH and will propel the bike 45+ miles at 25+ mph. One cent of electrical power will propel the bicycle approximately 4½+ miles. On average, each mile consumes 27 watts of electrical power per mile at 25+ mph.

By use of an aerodynamic fairing, an advantage of +4 watts per mile is achieved.

As further shown in FIGS. 1 through 4, the electric bicycle 20 is provided with a front wheel hand brake assembly 34 in selective operating engagement with the front wheel rim 35. The front wheel hand brake assembly 34 is selectively actuated by the hand brake lever 36 provided on the handle bar 24. The front wheel hand brake lever 36 is connected to the front wheel hand brake assembly 34 by actuating cable 37 which is only partially shown.

A rear brake assembly 38 is provided in selective operating engagement with the rear wheel rim 25a. The rear brake assembly 38 is selectively actuated by the rear wheel brake lever 39 acting through the actuating cable 39a.

Although the present invention utilizes traditional hand actuated mechanical brake systems which act upon the wheel rims, it is within the scope of this invention to utilize any type of motorcycle, moped or bicycle braking systems that are well known in the prior art. Further, while the braking system used in the instant invention includes a hand brake lever mechanical cable operated brake system, it is also within the scope of this invention to utilize hand or foot actuated hydraulic, mechanical or electrical powered braking systems in connection therewith which are well known in the prior art.

A multi-speed shift lever 40 is also provided on the handle bar 24 which selectively acts through cable 41 to selectively actuate the rear wheel multi-speed drive hub 27.

An adjustable seat 42 is also provided on the frame 21 of the electric bicycle 20. Further, handle grips 43 and foot rests 44 are provided on the electric bicycle 20.

An electrical control box 45 is provided on electric bicycle 20 on a support bar 31*a* directly above the batteries 32 and 33.

Figure 2:
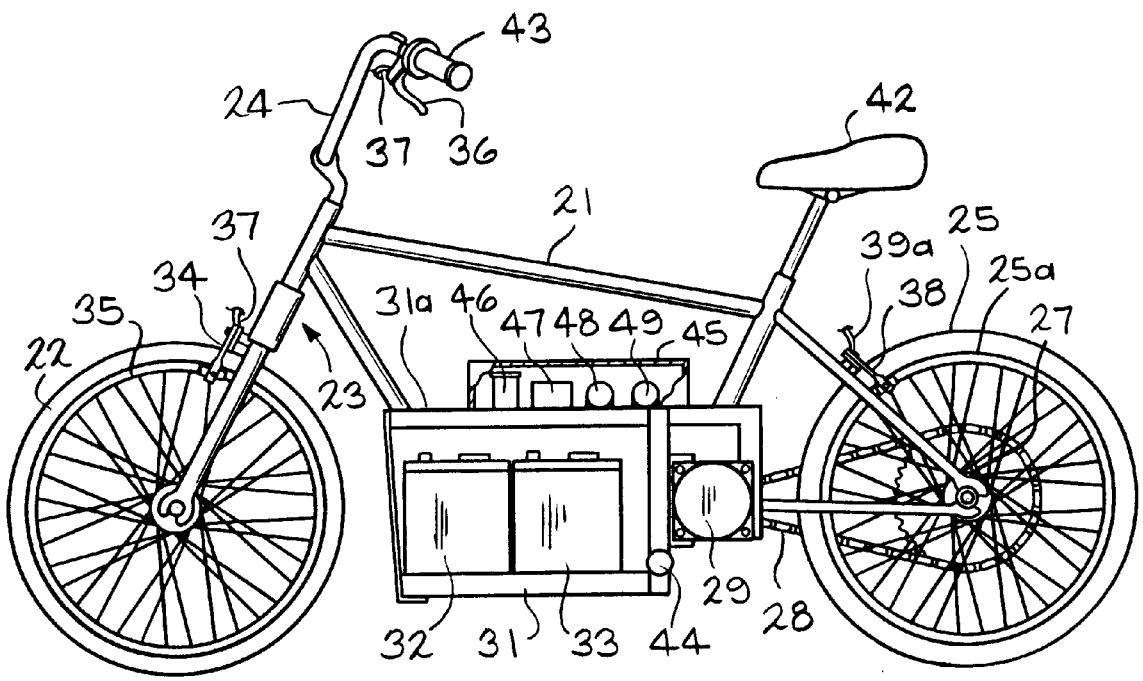
FIG. 2 is a schematic left side view of the electric bicycle.
Figure 3:
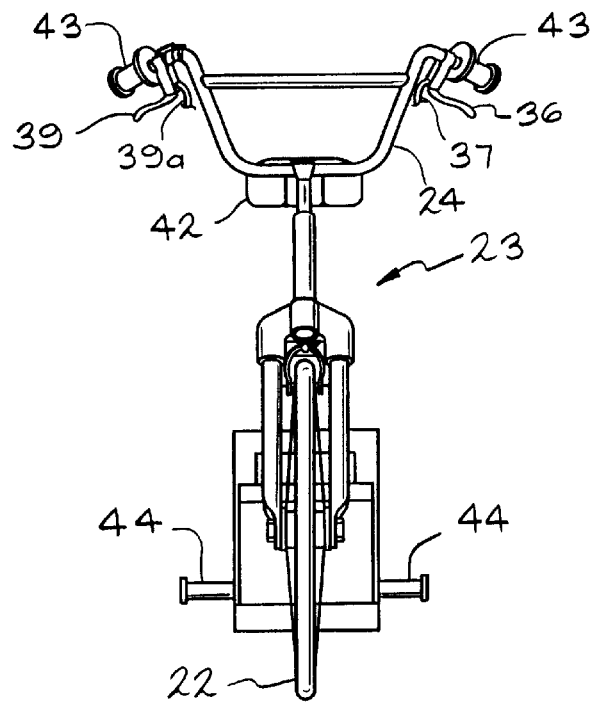
FIG. 3 is a schematic front view of the electric bicycle.
Figure 4:
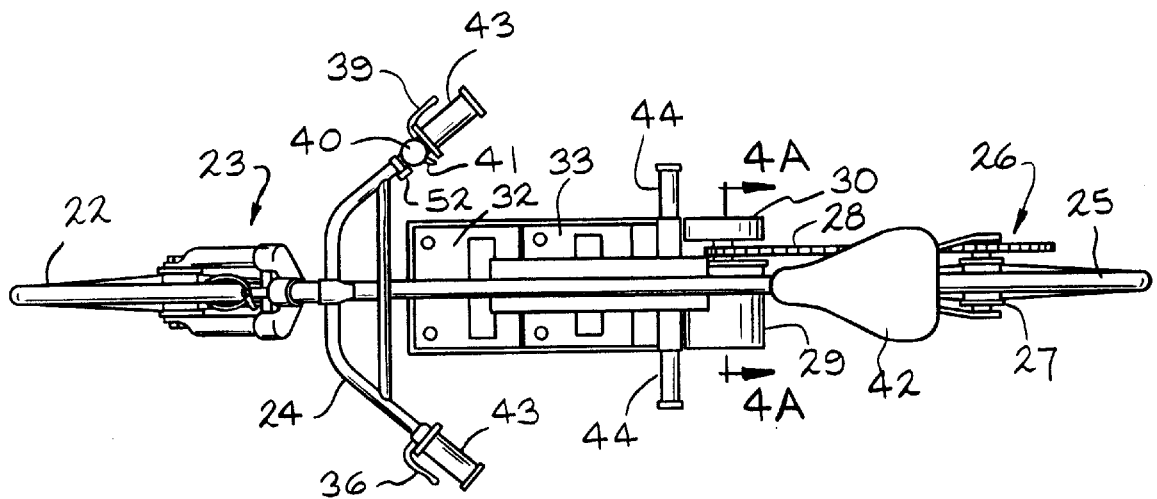
FIG. 4 is a schematic top view of the electric bicycle.
Figure 5:
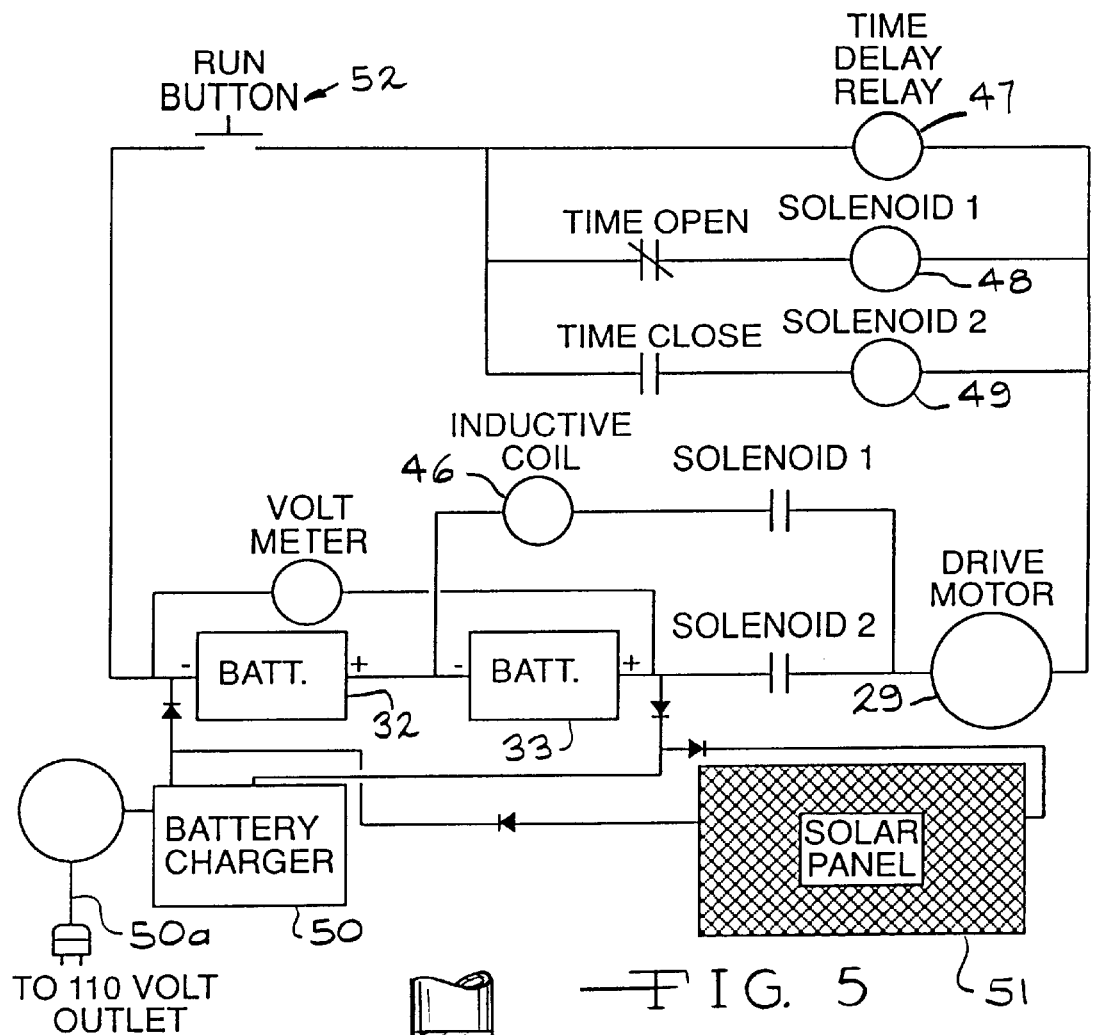
FIG. 5 is a circuit diagram showing the two-stage start-run control system, including an optional 110 volt battery charger and solar panel battery charger.

As shown schematically in FIG. 2 and in the circuit diagram of FIG. 5, a two-stage start-run control system is provided to selectively actuate the DC motor 29 to achieve optimum operating efficiency by avoiding excessive battery drain and also to prevent premature motor failure due to excessive wear or stress on the motor.

The electrical components contained in the control box 45 and shown in the circuit diagram consist of an inductive coil 46, a time delay relay 47, a first solenoid 48 and a second solenoid 49. However, it should be noted that the two-stage start-run control system could operate satisfactorily without the use of the inductive coil 46 in some applications, but it could be used as an option to further limit the initial current spike at the first stage.

In addition, as shown in FIG. 5, an optional battery charger 50 having a 110 volt connector cable 50*a* and an optional solar panel charger 51 can be provided as desired.

As further shown in FIG. 5, the unique two-stage start-run control circuitry embodied in this invention prevents high motor zero rpm in rush currents that can damage motor magnets and other wiring components.

The two-stage start-run control circuitry also prevents the immediate start-up high current drainage of the batteries which dramatically reduces operating range and efficiency.

The stage one start control begins the moment the start-run button 52 on the handle bar is depressed. When the start-run button is depressed, the time delay relay 47 is closed (energized) so as to close the first solenoid 48 so as to deliver 24 volts to the 36 volt motor 29 through a current limiting inductive coil 46. This further minimizes the zero rpm inrush current.

The stage one start-up automatically turns off via the time delay relay 47 which disengages the first solenoid 48 at approximately one-half second after the start-run button 52 is depressed. This enables the motor time to start and run up under 24 volt lower current conditions.

Thereafter, within 0.1 second after the first solenoid 48 disengages, the second stage start-run control permits the second solenoid 49 to engage so as to supply the full 36 volts to the motor 29 which has been pre-reved by the first stage, thus preventing any excessive energy loss or damage to the motor 29.

The foregoing discussion relates to the use of three 12-volt batteries. When only two 12-volt batteries are used, the first solenoid 48 is actuated to deliver only 12 volts to the motor through the current limiting inductive coil 46. The second stage then delivers the full 24 volts to the motor.

Figure 4A:
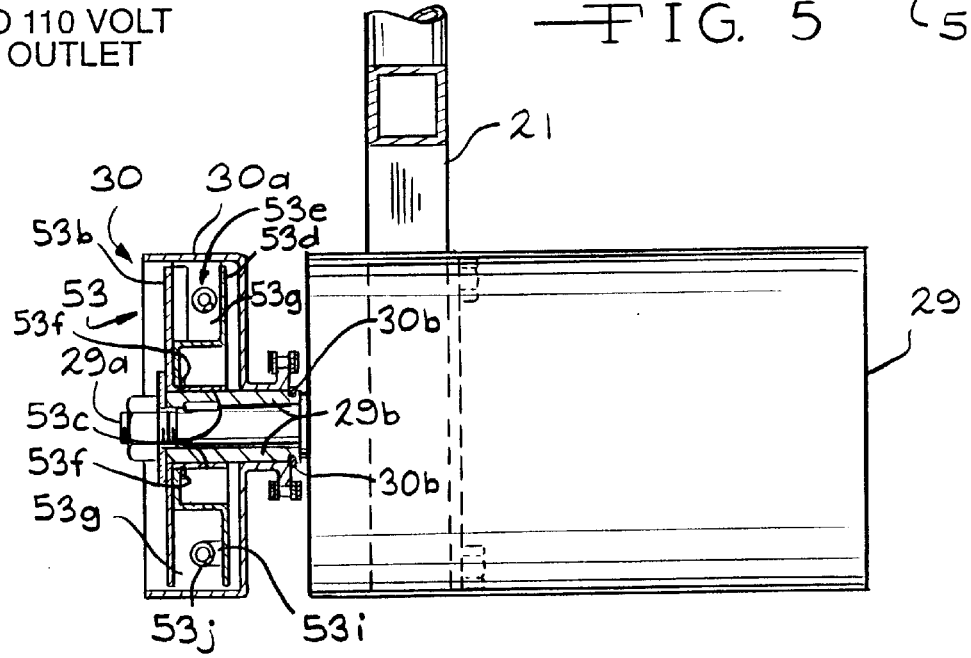
FIG. 4A is a sectional view taken on line 4A—4A of FIG. 4 showing the centrifugal slip clutch assembly.
Figure 6:
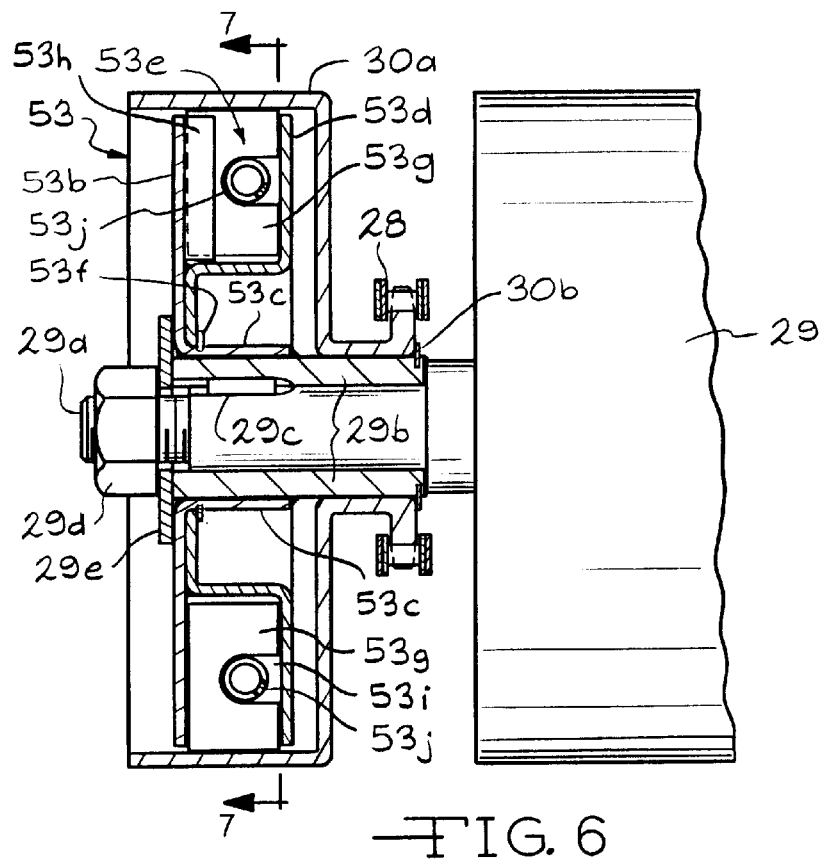
FIG. 6 is a partial schematic sectional view of the electric motor and the centrifugal slip clutch assembly.
Figure 7:
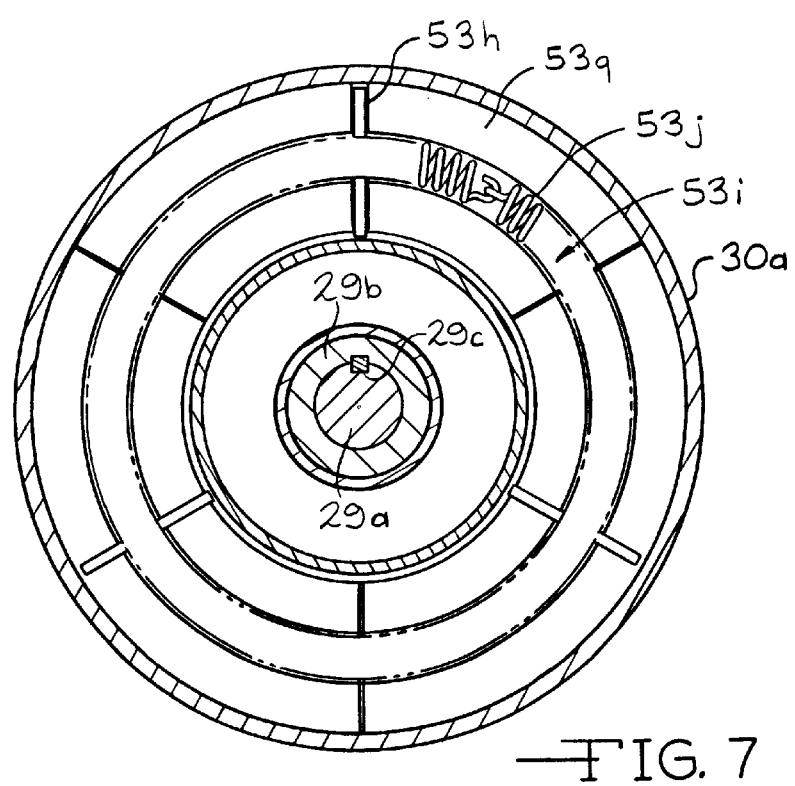
FIG. 7 is a sectional view taken on line 7—7 of FIG. 6.
Figure 8:
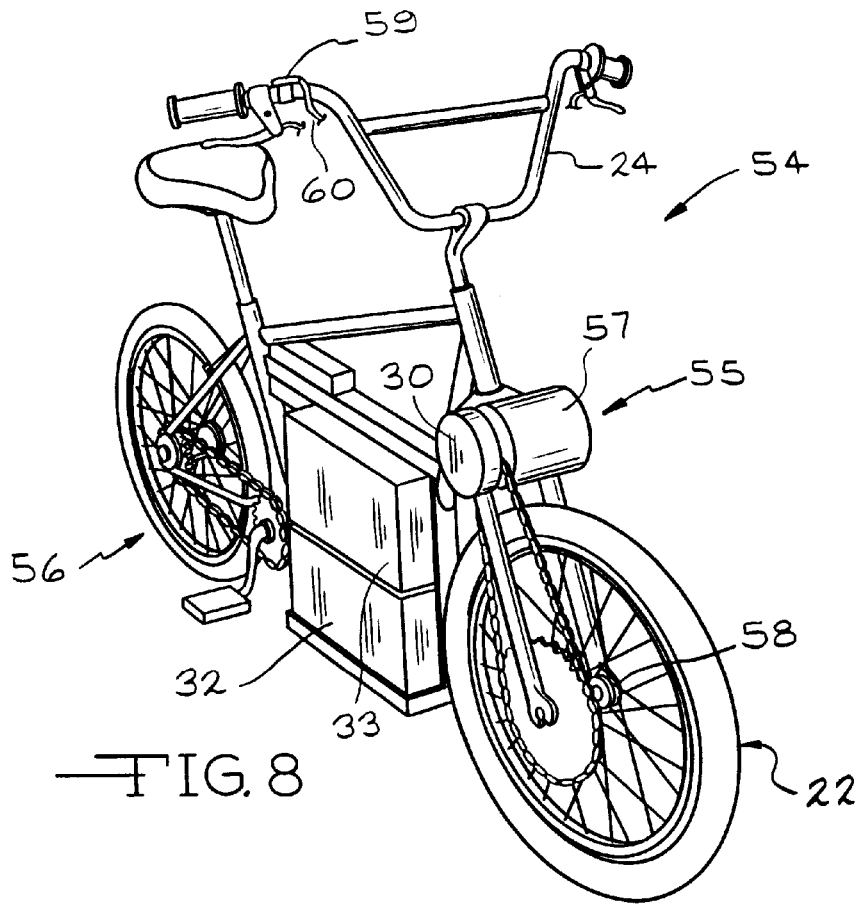
FIG. 8 is a schematic right side perspective view of another embodiment of the electric bicycle which is a hybrid having a front wheel electric drive and a standard bicycle multi-speed pedal rear drive.
Figure 9:
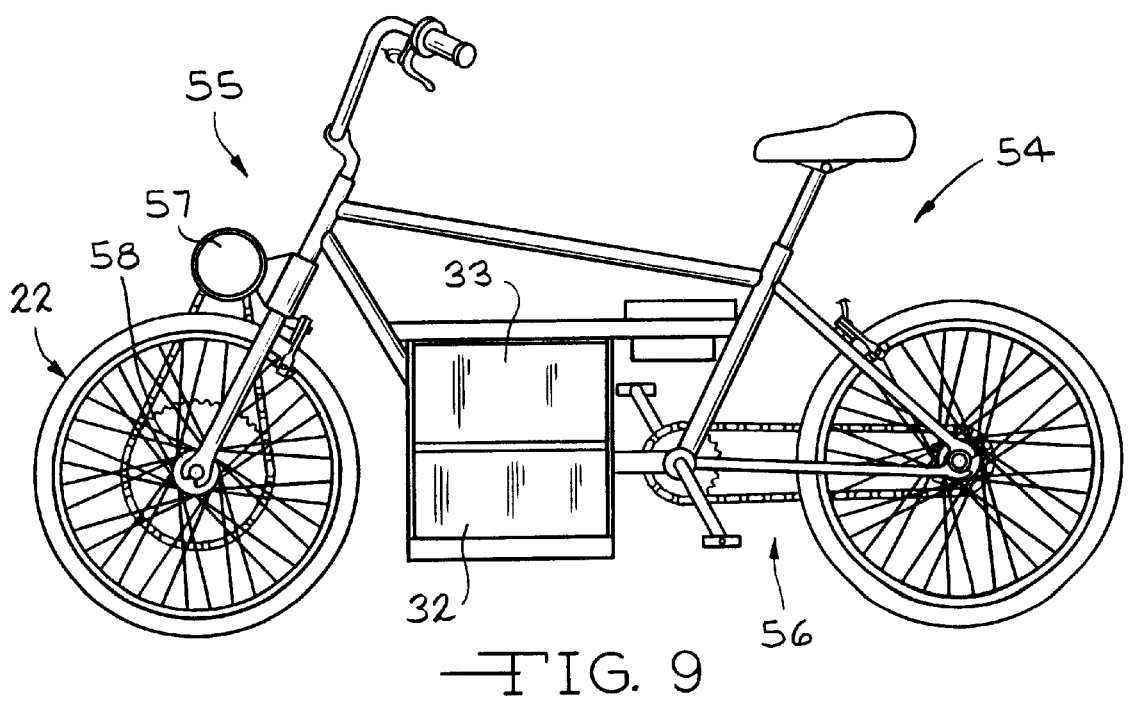
FIG. 9 is a schematic left side view of the hybrid electric bicycle shown in FIG. 8.
Figure 10:
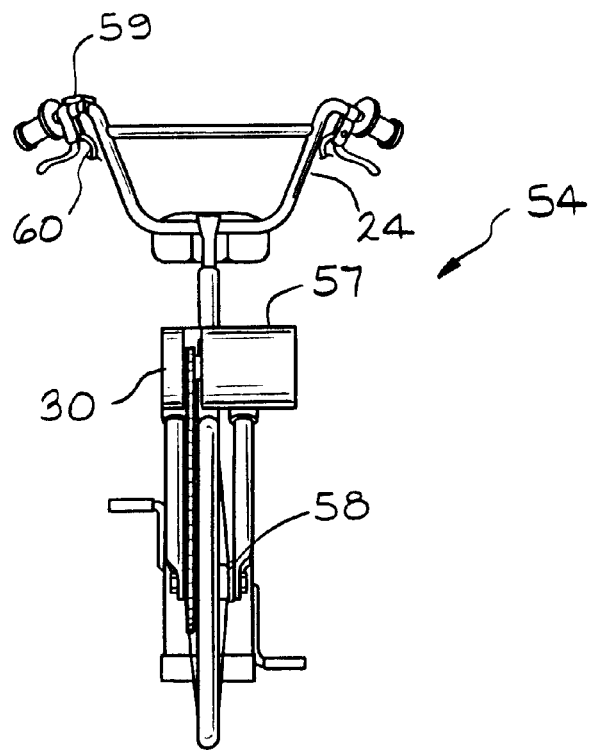
FIG. 10 is a schematic front view of the hybrid electric bicycle shown in FIG. 8.
Figure 11:
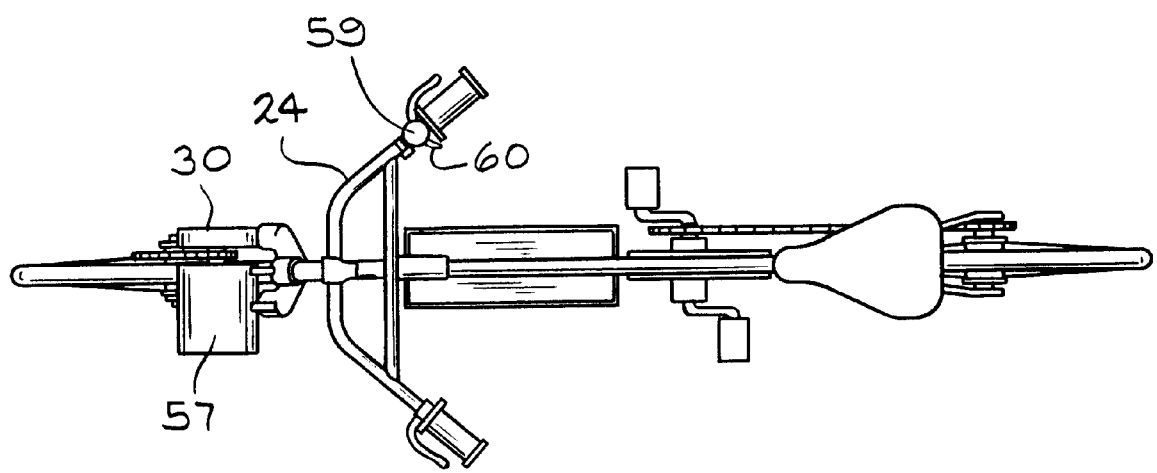
FIG. 11 is a schematic top view of the hybrid electric bicycle shown in FIG. 8.

As shown more specifically in FIGS. 4A, 6 and 7, the high performance DC electric motor 29 is operatively connected to the selectively tuned centrifugal slip clutch assembly 30 which acts to control the motor load so as to prevent low rpm excessive high motor currents that can damage the DC motor 29 and rapidly discharge the batteries causing a poor efficiency result.

The standard practice in the prior art devices is to provide rpm control on DC motors by using voltage dropping resistors, rheostats or variable frequency controllers. Such devices are heavy, inefficient or too expensive for use in connection with electric bicycles.

Heretofore, it has not been obvious to anyone skilled in the electric bicycle prior art to use an inexpensive and efficient tuned centrifugal clutch to manage the DC electric motor rpm, current and power output.

As shown in FIGS. 4A, 6 and 7, the motor drive shaft 29*a* is provided with a sleeve 29*b* mounted thereon. The sleeve 29*b* is rotatable with the motor drive shaft 29*a* by virtue of a key member 29*c*. The sleeve 29*b* is retained in its position by use of a nut 29*d* and a washer 29*e*.

The outer clutch shell housing 30*a* is concentrically freely mounted on the sleeve 29*b* and is not rotatable therewith when the motor 29 is actcuated at the outset. The outer clutch shell housing 30*a* is in fixed operative engagement with the drive chain assembly 28 so as to selectively drive the wheel connected thereto.

The outer clutch shell housing 30*a* is restricted from lateral movement along the sleeve 29*b* by use of a lock ring 30*b* mounted on the sleeve 29*b* adjacent to the outer clutch shell housing 30*a*.

An internal circular housing assembly 53 is comprised of an angular circular member 53*b* which is concentric to the outer clutch shell 30*a*. The angular circular member 53*b* is fixedly attached along its horizontal surface 53*c* to the outer surface of sleeve 29*b* so as to be rotatable therewith.

A circular member 53*d* is provided in mating free engagement with the angular circular member 53*b* so as to define a U-shaped portion 53*e*. The circular member 53*d* is maintained in its mating engagement with the angular circular member 53*b* by use of a lock ring 53*f*.

Thus positioned, the internal circular housing assembly 53 can be selectively removed for adjustment purposes as will hereinafter be described.

The U-shaped portion 53*e* of the internal circular housing assembly 53 is adapted to freely receive a plurality of curved weights 53*g* as shown in FIGS. 6 and 7. The weights 53*g* are freely separated by weight retainer members 53*h*. The weights 53*g* are provided with spring retainer slots 53*i*.

As more specifically shown in the cross-sectional view of FIG. 7, a tension spring 53*j* is provided in the spring retainer slots 53*i* so as to retain the weights 53*g* in their rest position within the U-shaped portion 53*e* away from the inner surface of the outer clutch shell housing 30*a*. The tension spring 53*j* can be selectively "tuned" by varying the tension of the spring 53*j* as desired.

At rest, the co-acting weights 53*g*, the weight retainers 53*h* and the tension spring 53*j* are positioned away from the internal surface of the clutch shell housing 30*a*. This angular circular member 53*b* is fixedly mounted on the sleeve 29*b* which is keyed to the motor shaft 29*a* and is adapted to start to spin when the motor 29 is actuated by the start-run button 52.

The spinning action exerts a centrifugal force upon the spinning weights 53*g*. As the centrifugal force overcomes the tuned tension of the tension spring 53*j*, the weights 53*g* begin to move outwardly so as to operationally engage the internal surface of the clutch shell 30*a*. This locking engagement occurs at approximately 7 mph in first gear so as to create a direct drive between the motor 29 and the drive chain 28.

When the start-run button 52 is released, the motor slows down and stops. The centrifugal force stops and the weights 53g disengage from the outer clutch shell 53 under the effect of the tuned spring 53j so that the motor 29 is no longer driving the bicycle. The bicycle 20 then begins to freely coast in the usual manner.

In the preferred embodiment, the tuned centrifugal slip clutch assembly 30 must be tuned to lockup at approximately 50 percent of peak rpm. This will prevent the high efficiency motor from trying to start moving the electric bicycle at low rpm which would cause the normal current load of 18 amps at 1800 rpm to reach destructively high current values during acceleration from 0 to approximately 7 mph. This situation of very high current load would rapidly drain a battery. This is one of the key obstacles that must be overcome in the design of an efficient electric bicycle.

As previously stated, those who are skilled in the prior art of electric bicycles have heretofore used energy wasting rheostats or voltage dropping resistors with resultant low operating range. It should be noted that the high current start up problem may cause premature motor failure as well as unsafe operation of the electric bicycle. The use of the centrifugal clutch 30 also prevents the dramatic lurch forward when the start-run button is engaged.

It should be noted that other types of clutches can be used so long as they have the capability of controlling the motor load so as to prevent low rpm excessive high motor currents that can damage the motor and rapidly discharge the batteries, thereby causing a poor efficiency result.

As shown in FIGS. 8 through 11, another embodiment of this invention is shown which is a hybrid electric-pedal bicycle 54 which utilizes an electric front wheel drive assembly 55 and a standard foot pedal rear wheel drive assembly 56.

The front wheel drive assembly 55 is powered by an 80% plus efficiency electric motor 57 which is operably connected to a tuned centrifugal clutch assembly 30 as previously described herein. A front wheel multi-gear transmission assembly 58 is provided in the hub of the front wheel 22. The front wheel multi-gear assembly 58 is selectively actuated by a front wheel gear shift lever 59 provided on the handle bar 24. The gear shift lever 59 is operably connected to the multi-gear assembly 58 by cable 60 partially shown.

The foot pedal rear wheel drive assembly 56 is a standard manually operated sprocket driven rear wheel so as to enable the operator to operate the bicycle when desired. It is within the scope of the invention to provide a battery charging capability when desired.

As shown in FIGS. 12 through 17, another embodiment of this invention utilizes a variable ratio V-belt drive assembly 61 having a centrifugal clutch capability so as to engage at a predetermined RPM.

The advantage of this variable ratio V-belt drive assembly is that it manages itself (no shifting of gears). This drive assembly changes the drive ratio (relationship of motor RPM to drive wheel RPM) as a result of increase in motor RPM.

As shown in the right-side schematic view of the variable ratio V-belt drive assembly 61 shown in FIG. 12, the rear-driven pulley assembly 62, the forward driving pulley assembly 63 and the V-belt 64 in operative engagement therewith are positioned in their zero RPM stationary position.

As shown in the right side schematic view of FIG. 13, the rear driven pulley assembly 62, the forward driving pulley assembly 63 and the V-belt 64 in operative engagement therewith are positioned in their full RPM position.

As shown in the schematic top view of FIG. 12A, the variable ratio V-belt-drive assembly 61 is shown in its operative use position with the drive motor 65, the forward driving pulley assembly 63, and the rear driven wheel pulley assembly 62. The schematic top view of FIG. 12A shows the zero RPM position as shown in FIG. 12.

Figures 14, 15:
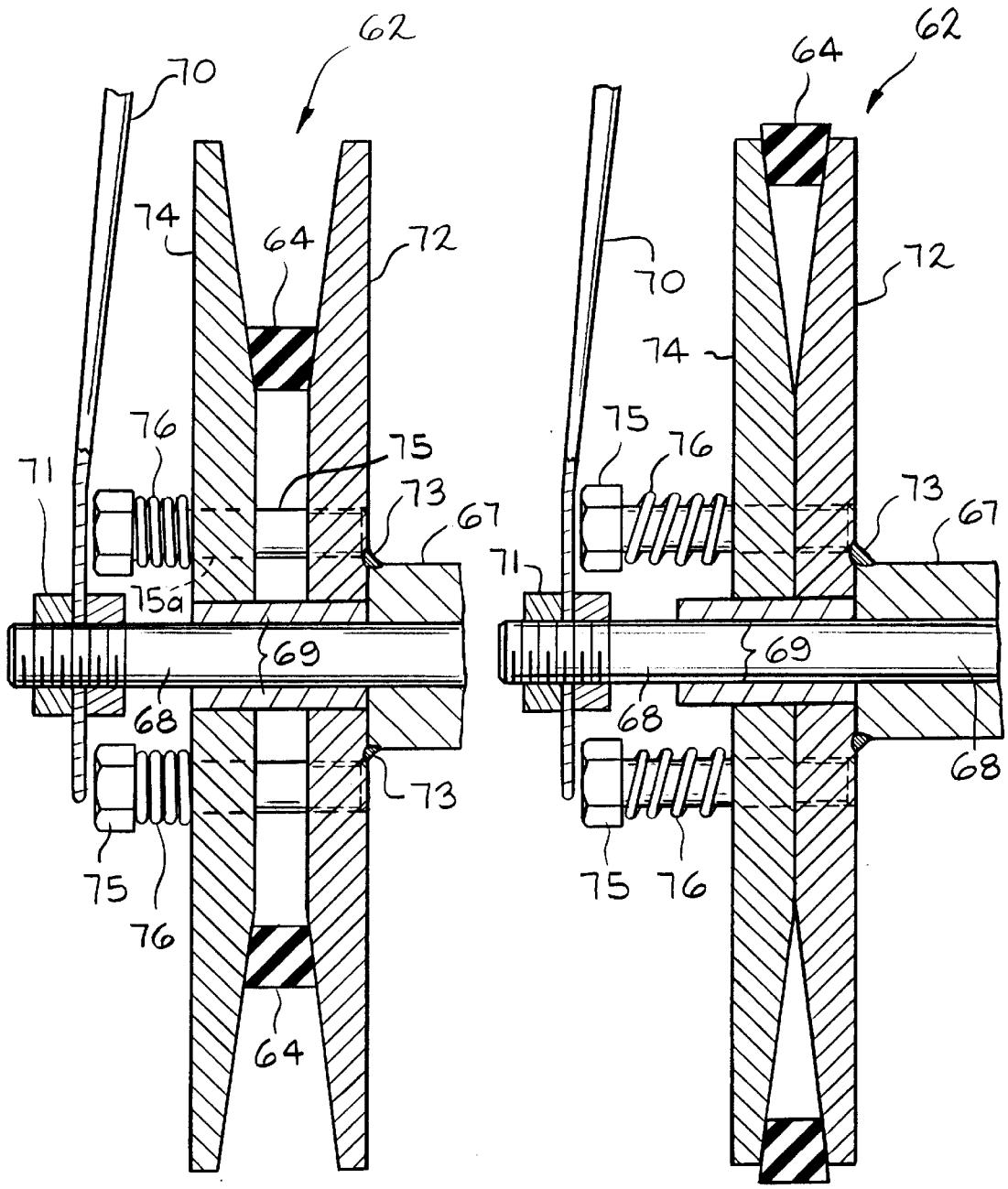
FIG. 14 is a schematic partial cross-sectional view of the variable ratio V-belt drive or assembly embodiment taken on line 14—14 of FIG. 12.
FIG. 15 is a schematic partial cross-sectional view of the variable ratio V-belt drive or assembly embodiment taken on line 15—15 of FIG. 13.

As shown in the schematic cross-sectional view of FIG. 14 which is taken on line 14—14 of FIG. 12, the rear wheel driven pulley assembly 62 is shown in its closed zero RPM position with the drive-belt 64 located at outer circumferential perimeter of the closed pulley assembly 62.

As shown in FIG. 15, the rear wheel driven pulley assembly 62 and rear wheel hub 67 are rotatably mounted on the fixed rear wheel support axle 68. The rear wheel driven pulley assembly 62 is supported on the fixed rear wheel axle 68 by roller bearings 69. The fixed rear wheel support axle 68 also supports the bicycle frame rear wheel engaging struts 70.

Retainer jam nuts 71 are provided at each end of the rear wheel support axle 68.

The pulley assembly 62 is comprised of an inner pulley wall half 72 which is fixedly attached by welding 73 to the rear wheel hub 67 so as to be selectively rotatable therewith so as to selectively drive the rear wheel assembly 66 when the motor 65 is actuated.

The rear driven pulley assembly 62 has a movable outer pulley wall half 74 which is selectively movable toward and away from the inner pulley wall half 72 in response to selective movement of the V-belt 64. The movable pulley wall half 74 is slidably mounted on a plurality of spring retainer bolts 75 which freely pass through openings 75a provided in the movable pulley wall half 74 so as to threadably engage the inner pulley wall half 72 so as to be rotatable therewith. The hexagonal head spring retainer bolts 75 are provided with tension springs 76 which act upon the back of the movable outer pulley wall half 74 so as to move it to its normal closed rest position when the V-belt returns to its zero RPM rest position as shown in FIG. 14.

As shown in FIG. 15, as the RPM of the V-belt 64 increases, the V-belt 64 is pulled inward so as to cause the outer movable pulley wall half 74 to move away from the stationary inner pulley wall 72 to its full RPM position thereby compressing the tension springs 76. It should be noted that there are four equally spaced-apart spring retainer bolts 75 provided on the movable outer pulley half 74 as shown in FIG. 12. However, it is considered to be within the scope of the invention that any desired equally spaced-apart bolts 75 be utilized as required.

As shown in the schematic cross-sectional view of FIG. 16 taken on line 16—16 of FIG. 12, the forward driving pulley 63 is shown in its open zero RPM position in operative use position on the motor shaft 65a of the drive motor 65.

The inner driving pulley wall half 77 is fixedly attached to the motor shaft 65a by a shaft key member 78 and retainer screws 79 so as to be rotatable therewith but not laterally movable with respect thereto.

As shown in FIG. 16, an outer driving pulley wall half 81 is keyed to the motor shaft 65a so as to be rotatable therewith. In addition, the outer driving pulley wall half 81 is selectively laterally movable toward and away from the fixed inner driving pulley wall half 77 in response to changes in RPM of the motor 65.

A clutch cover 80 is fixedly attached to the motor shaft 65a by use of retainer screws 79 and also by the shaft key member 78 so as to be rotatable therewith but not laterally movable with respect thereto. The outer pulley half 81 is provided with a circumferential flange 81a which freely overlaps the outer perimeter of the clutch cover 80 when the outer pulley half 81 is in its 0 rpm position as shown in FIG. 16.

The lateral movement of the outer driving pulley wall half 81 is controlled by a system of cylindrical clutch weights 82 which are movably retained within coacting weight slots 80a and 81b provided in the inside surface of the clutch cover 80 and the outer surface of the movable driving pulley wall half 81, respectively. The coacting weight slots 80a and 81b are in spaced-apart register so as to define a channel 81c within which the cylindrical weights 82 move outwardly in response to centrifugal force created by changes in RPM after the motor 65 is started.

Figure 16A:
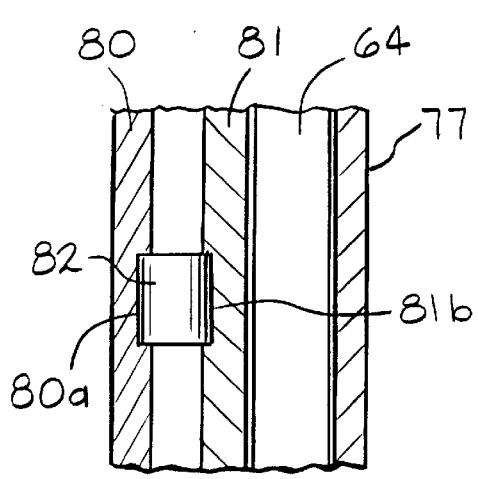
FIG. 16A is a schematic partial cross-sectional view of the variable ratio V-belt drive assembly taken on line 16A—16A of FIG. 16.

As shown in the partial schematic view of FIG. 16A taken on line 16A—16A of FIG. 16, the cylindrical weights 82 are shown in their 0 rpm rest position within their respective slots 80a and 81b provided in the clutch cover 80 and the movable pulley half 81, respectively.

Figure 17A:
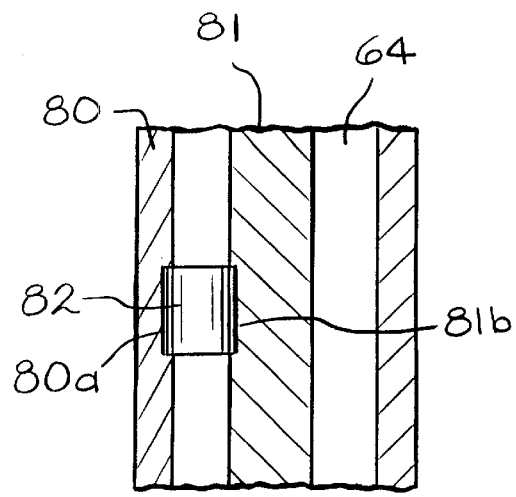
FIG. 17A is a schematic partial cross-sectional view of the variable ratio V-belt drive assembly taken on line 17A—17A of FIG. 17.

As shown in the partial schematic view of FIG. 17A taken on line 17A—17A of FIG. 17, the cylindrical weights 82 are shown in their full rpm position within their respective slots 80a and 81b provided in the clutch cover 80 and the movable pulley 81, respectively.

Figure 16B:
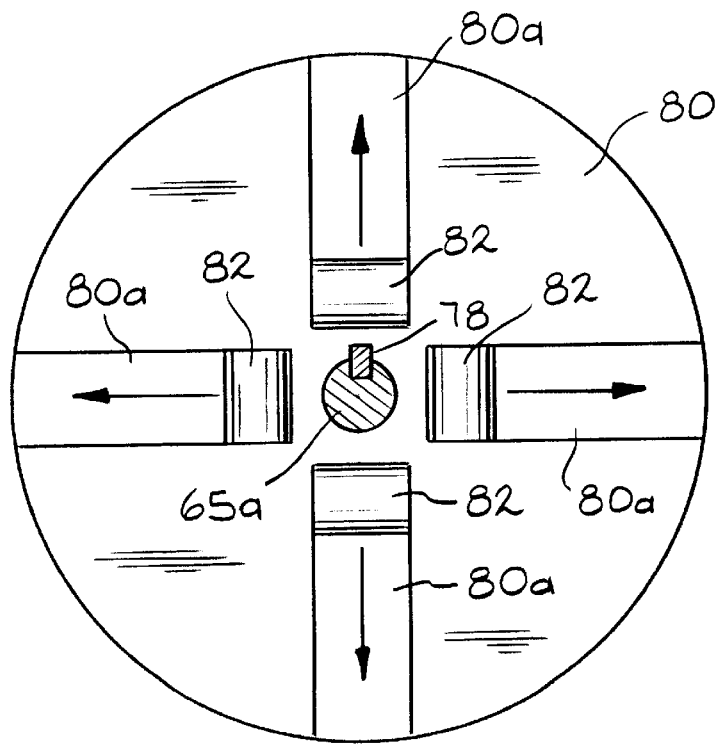
FIG. 16B is a schematic elevational view of the inside surface of the clutch cover for the variable ratio V-belt drive assembly as shown in FIGS. 12 and 13 and FIGS. 16 and 17.

The schematic rear elevational view of FIG. 16B shows the cylindrical weights 82 in their respective slots 80a at their 0 rpm rest position.

As previously stated, the forward driving pulley 63 is shown in its open zero RPM operative use position in FIG. 16. In the open zero RPM position shown in FIG. 16, the V-belt 64 is shown in the innermost position in the open forward driving pulley 63 proximate to the motor drive shaft 65a. The centrifugal clutch weights 82 remain at rest at the innermost of their respective channels 80a and 81b proximate to the motor drive shaft 65a, as shown in FIG. 16.

After the motor 65 is started, the driving pulley assembly 63 begins to rotate because it is rotatably attached to the motor shaft 65a. As the motor RPMs increase, the resultant centrifugal force causes the centrifugal clutch weights 82 to move outwardly through channel 81c defined by their respective slots 80a and 81b, thus exerting force upon the movable driving pulley wall half 81 so as to cause it to move away from the fixed clutch cover 80 laterally toward the fixed inner driving pulley wall half 77.

As shown in FIG. 17, the movable driving pulley wall half 81 closes toward the fixed pulley wall half 77 in response to the force exerted by the outwardly moving weights 82. The V-belt 64 is thus squeezed between the movable driving pulley wall 81 and the fixed driving pulley wall half 77 so as to move outwardly to the outer circumferential edge of the driving pulley 63 as further shown in FIG. 17.

The net effect of the movement of the V-belt 64 to the outer circumferential edge of the driving pulley 63 is to cause the V-belt 64 to move inward in relation to the rear-driven pulley 62. Thus, the outward movement of the V-belt 64 within the driving pulley 63 forces the V-belt 64 toward the center of the driven pulley 62 so as to compress the tension springs 76.

As the motor RPM increases to approximately 50% of full RPM, the pulley halves 81 and 77 begin to grip the V-belt 64 and start the electric bike moving forward. Before the V-belt 64 can move inward between the rear pulley halves 74 and 72 as shown in FIG. 15, the centrifugal force pushing the driving pulley halves 77 and 81 together must be greater than the resistance of the rear-driven pulley tension springs 76 so as to change the front to rear pulley drive ratio.

The tension of the rear pulley springs 76 are tuned to the clutch weights 82 so as to start clutch engagement at 50% of full RPM. As the motor RPM exceeds 70% of full RPM, the drive ratio begins to change and at 90% of full RPM the drive ratio is at its top speed ratio. The full RPM position of the driving pulley 63 is shown in FIG. 17.

The advantage of the variable ratio V-belt drive system with tuned centrifugal clutch as shown and described herein is that it manages itself (no shifting of gears). This drive system changes the drive ratio (relationship of motor RPM to drive wheel RPM) as a result of increase in motor RPM.

Figure 18:
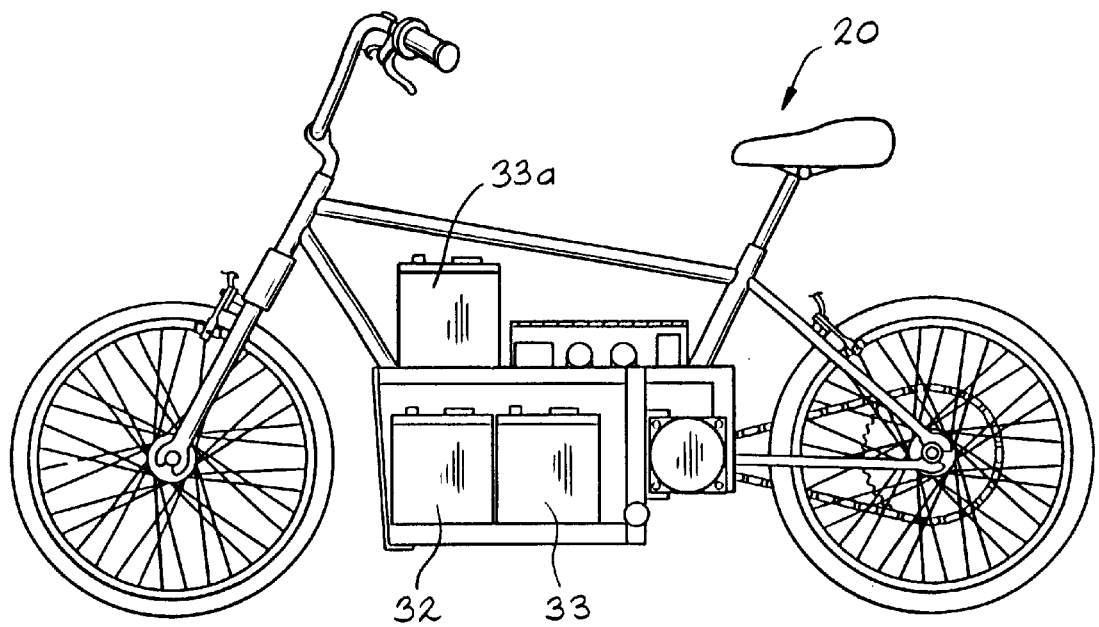
FIG. 18 is a schematic side view of another embodiment of the electric bicycle showing the use of three 12-volt batteries.
Figure 19:
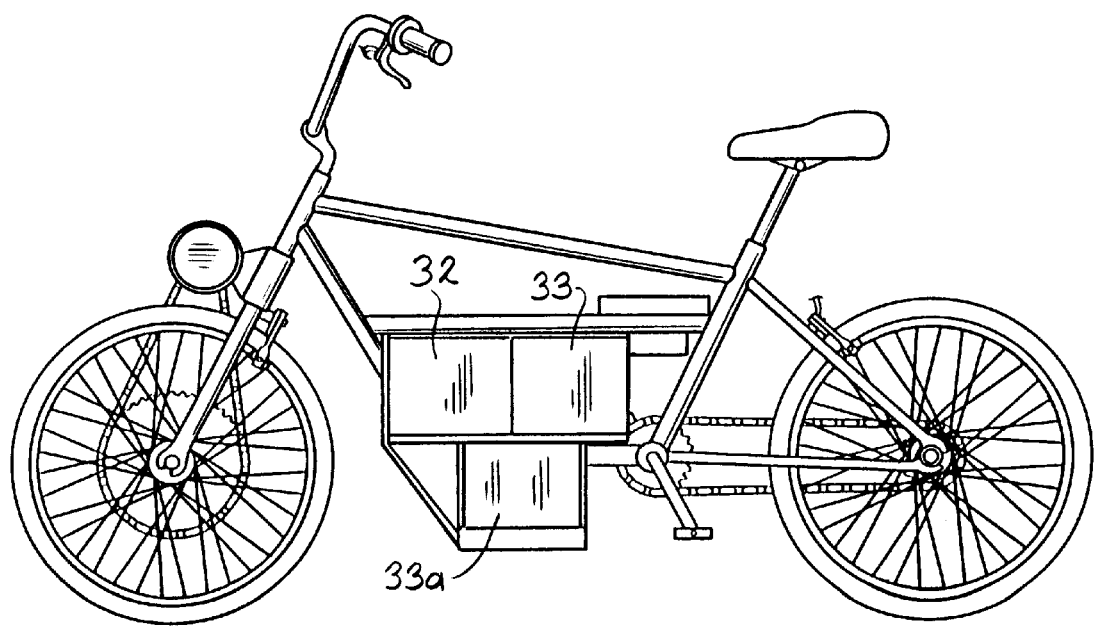
FIG. 19 is a schematic side view of yet another embodiment of the hybrid electric bicycle showing the use of the three 12-volt batteries.
Figure 23:
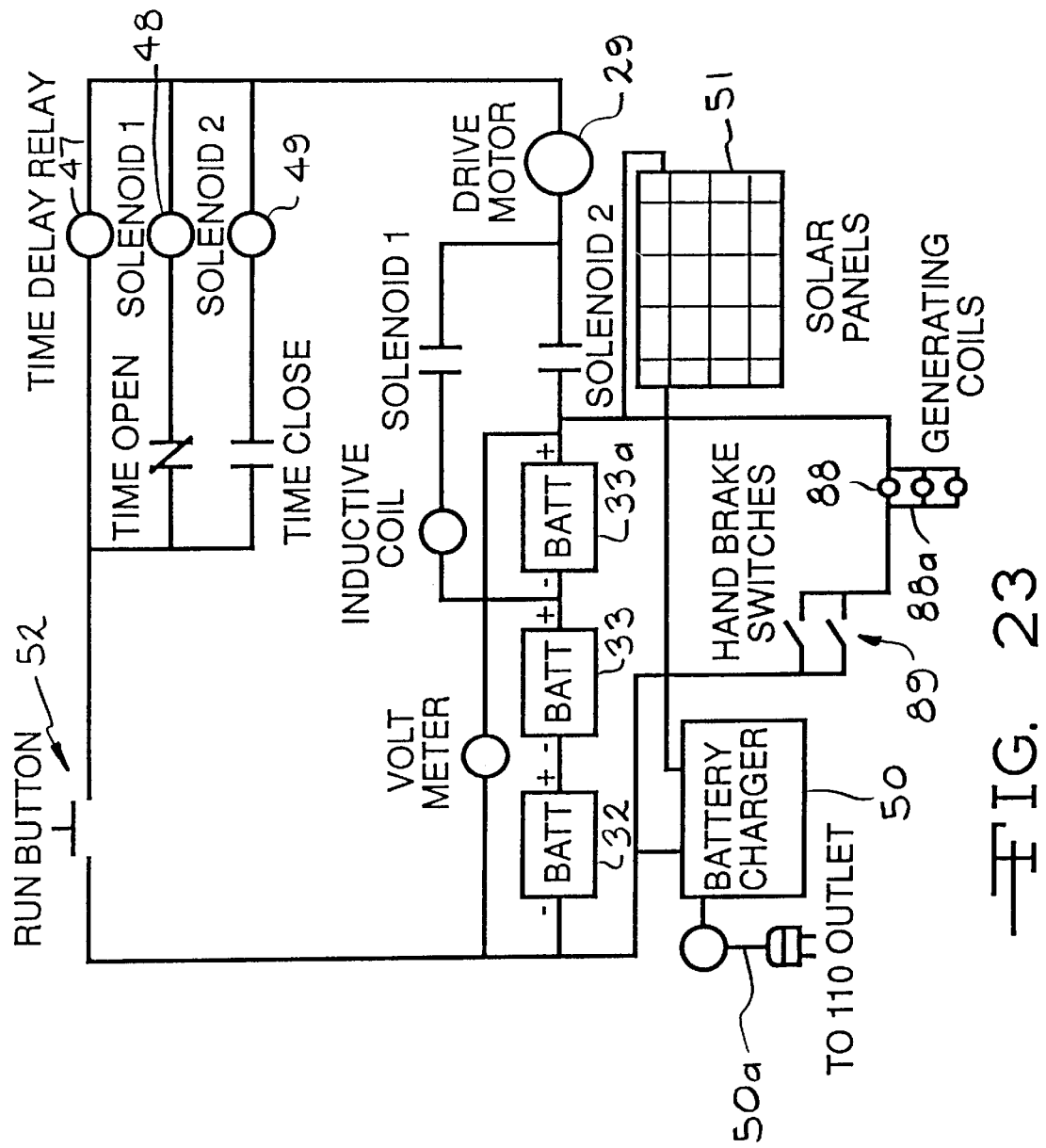
FIG. 23 is a circuit diagram of the three battery embodiment of the electric bicycle provided with a 110 volt battery charger, regenerating wheel assembly and solar charger panels.

Another embodiment of this invention is shown in FIGS. 18, 19, and in the schematic circuit diagram of FIG. 23.

As specifically shown in FIG. 18, the rear wheel powered electric bicycle 20 is provided with three batteries 32, 33 and 33a respectively, instead of two batteries as shown and described in FIG. 2. As specifically shown in FIG. 19, the front wheel powered electric bicycle 54 is also provided with three batteries, 32, 33 and 33a.

It is obvious that the use of three batteries substantially increases the operating range of the electric bicycles. In addition, the use of three batteries enables the use of a more powerful motor because the use of three batteries provides 50% more battery capacity.

Another embodiment of this invention is a regenerating wheel rotor assembly 83 which is selectively mounted on the front wheel 22. The regenerating wheel rotor assembly 83 is adapted to recharge the batteries while braking, as needed, while the electric bicycle is in motion.

Figure 20:
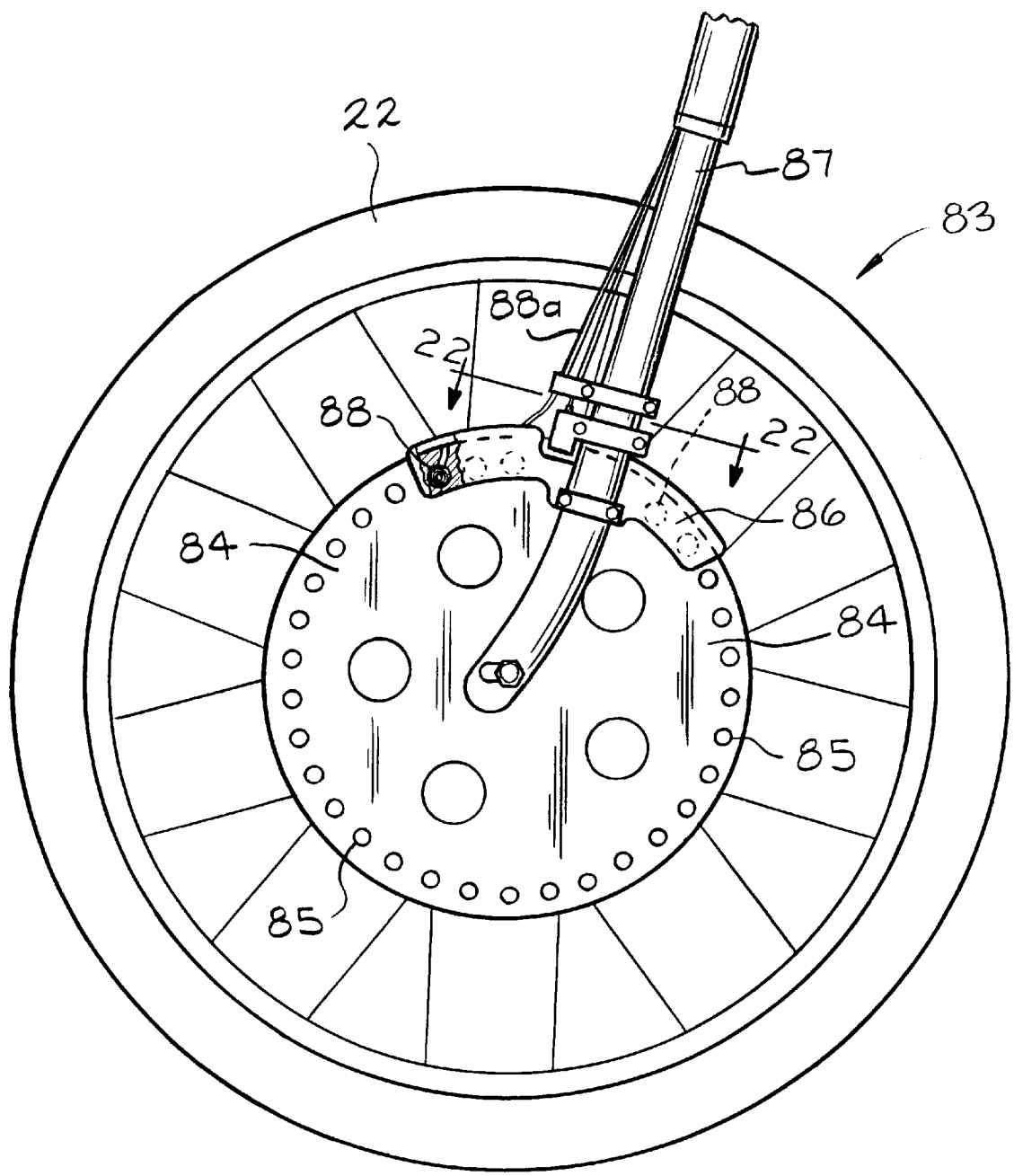
FIG. 20 is a schematic side view of yet another embodiment of the electric bicycle showing the use of a regenerating wheel assembly having a rotor with permanent magnets coacting with brake caliper mounted generating coils.

As shown in the left side schematic view of FIG. 20, the regenerating wheel rotor assembly 83 includes a rotor 84 which is fixedly attached to the wheel 22 so as to rotate therewith. The rotor 84 is provided with a series of spaced-apart permanent magnets 85 permanently mounted along the outer perimeter thereof. A U-shaped arcuate generating coil holder 86 is selectively mounted on the bicycle wheel yoke strut member 87 so as to selectively position the coil holder 86 in a bracketing free operative engagement with the outer peripheral edge of the rotor 84. The arcuate generating coil holder 86 is provided with a series of fixedly positioned spaced-apart generating coils 88 on each leg of the U-shaped holder 86. The fixed generating coils 88 are in selective spaced-apart operative register with the fixed permanent magnets 85 provided around the outer peripheral edge of the rotor 84.

As the rotor 84 rotates with the wheel, the outer peripheral edge portion thereof passes through the U-shaped arcuate generating coil holder 86 so that the magnets 85 pass between the generating electrical coils 88 so as to induce a voltage and current into the generating coils 88.

Figure 21:
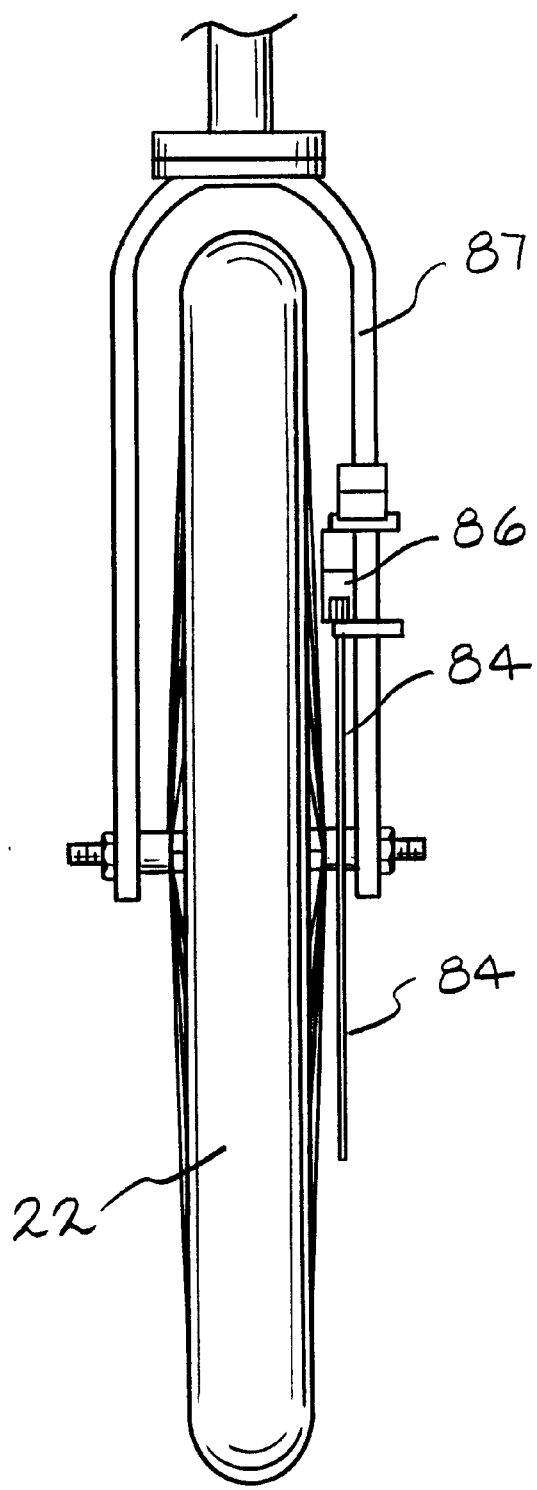
FIG. 21 is a schematic front view of the regenerating wheel assembly shown in FIG. 20.

The front schematic view of FIG. 21 further shows the interrelationship of the various components of the regenerating wheel rotor assembly 83 shown in FIG. 20.

Figure 22:
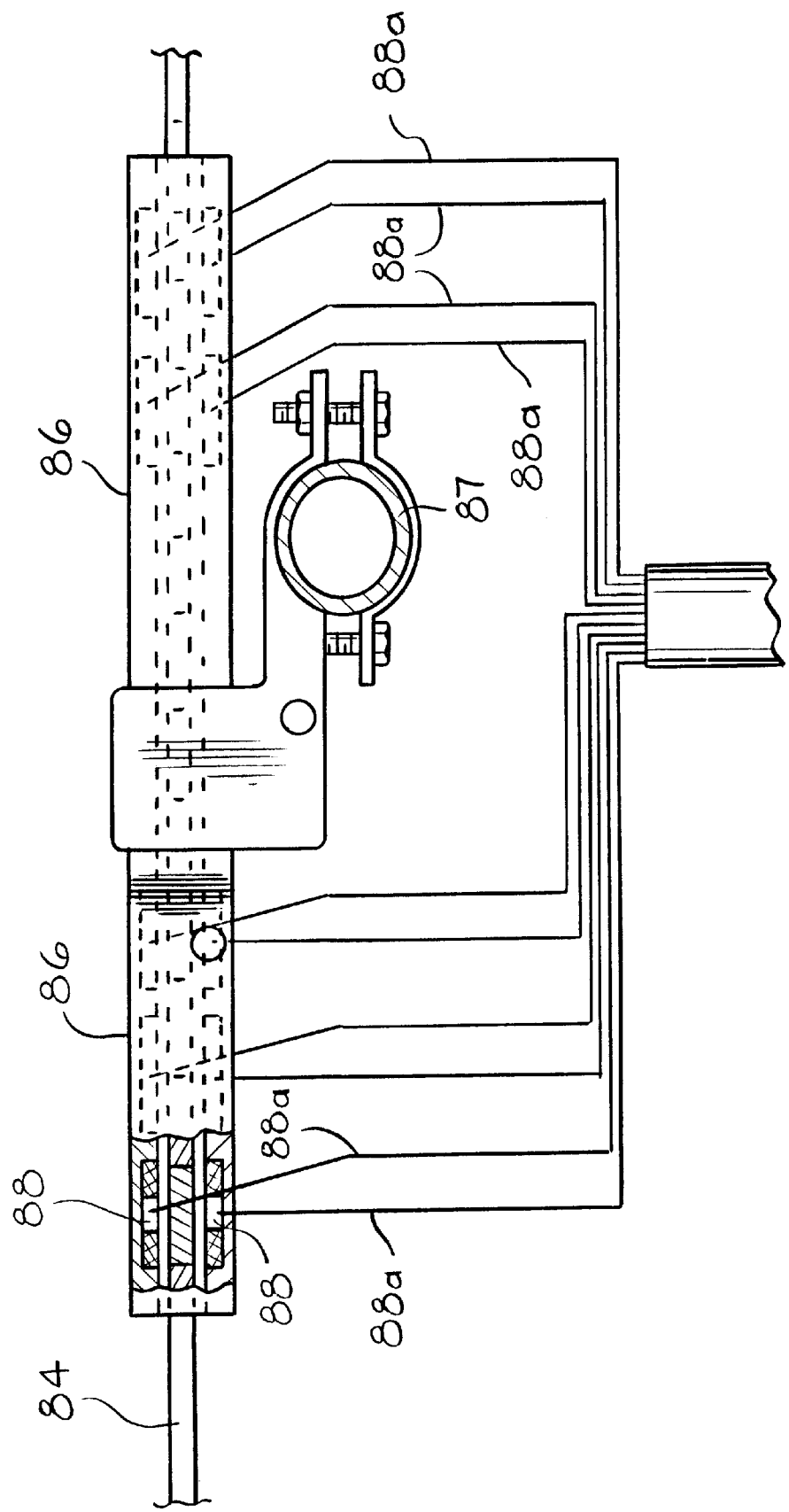
FIG. 22 is a schematic partial sectional view taken on line 22—22 of FIG. 20.

As further shown in FIG. 20 and in the cross-sectional schematic view of FIG. 22 taken on line 22—22 of FIG. 20, an electrical cable assembly 88a collects and carries the induced voltage and current to the hand brake actuated switches 89 provided on the handle bar 24. This further is shown in circuit diagram of FIG. 23. By use of switches 89 incorporated into the hand brake levers, the voltage and current from the generating coils is incorporated into the battery circuit as shown in FIG. 23 so as to selectively recharge the batteries while the bicycle is braking.

Figure 24:
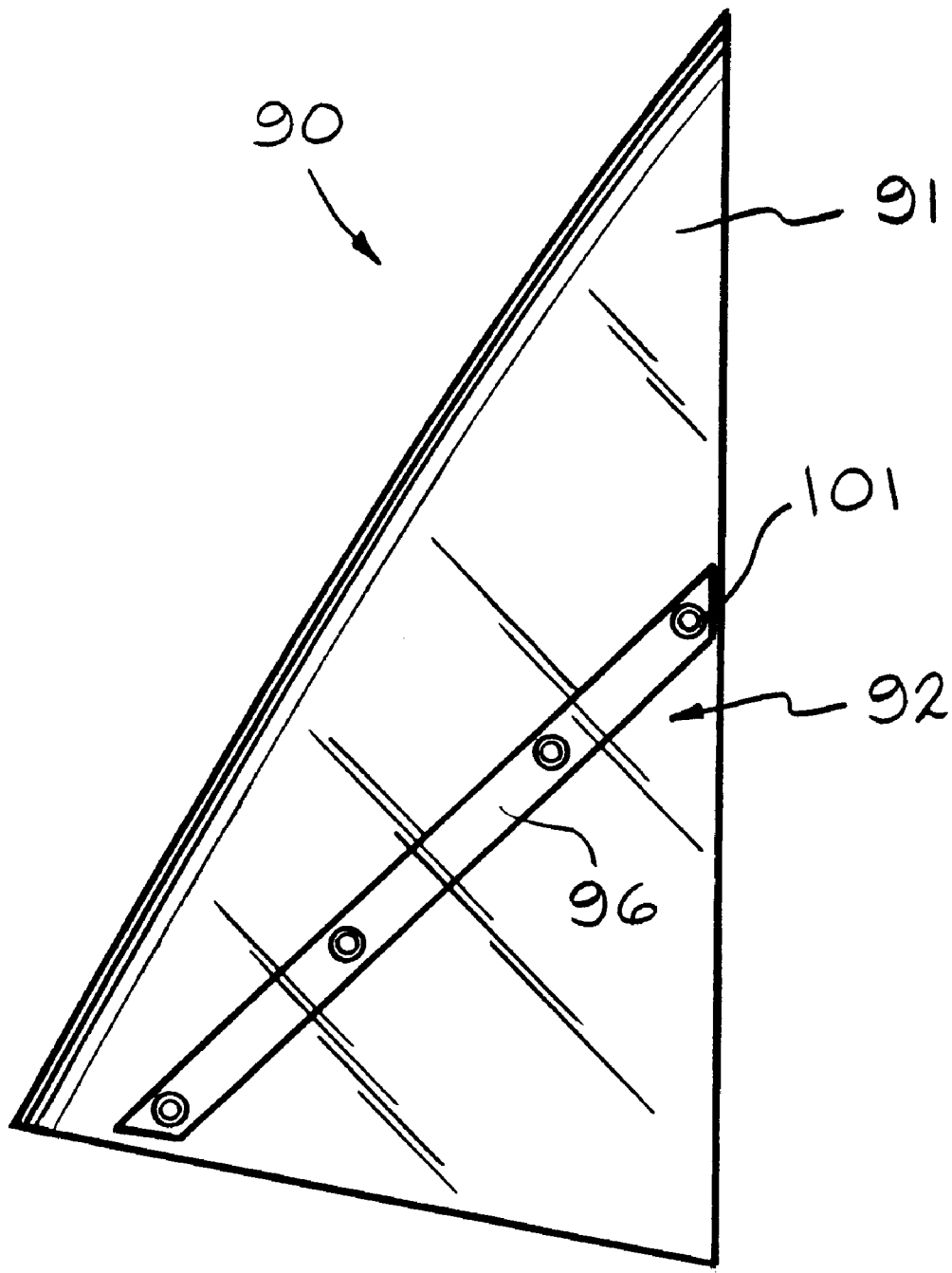
FIG. 24 is a schematic side view of the aerodynamic fairing assembly which is selectively positioned on the front wheel and steering assembly of the electric bicycle.

As shown in the schematic side view of FIG. 24, a semi-flexible aerodynamic fairing assembly 90 is provided for selective mounting on the electric bicycle. The aerodynamic fairing 90 is comprised of a flexible semi-rigid plastic or plexiglas sheet 91 which is mounted on support frame assembly 92.

Figure 25:
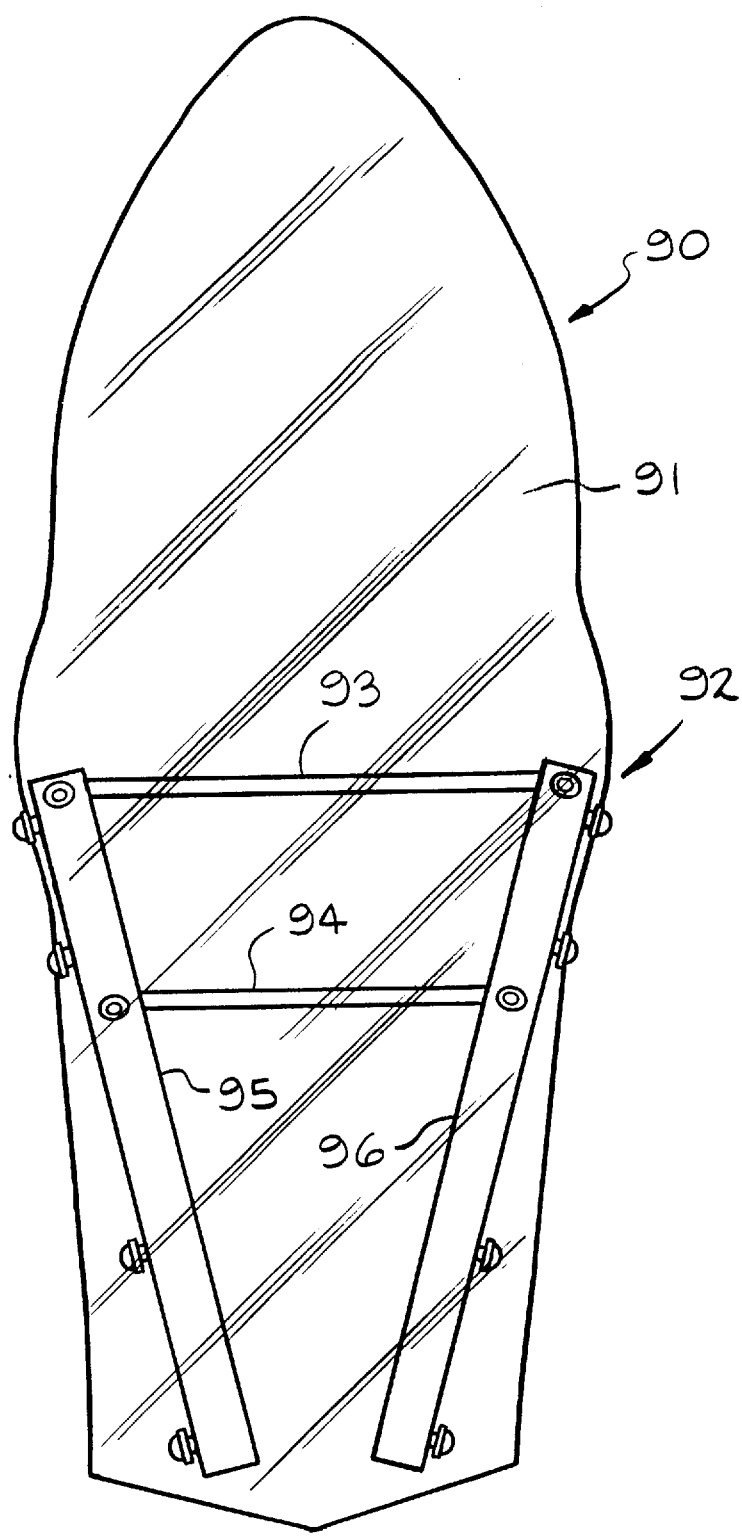
FIG. 25 is a schematic front view of the aerodynamic fairing assembly shown in FIG. 24.

As shown in the schematic front view of FIG. 25, the aerodynamic fairing surface 91 is fixedly mounted on the support frame assembly 92. The support frame 92 is comprised of light-weight horizontal support struts 93 and 94, respectively, which fixedly engage the diagonal support members that engage the plastic fairing surface. The diagonally oriented support struts 95 and 96 are adapted to supportably engage and maintain the fairing surface 91 in its curved aerodynamic fairing position.

Figure 26:
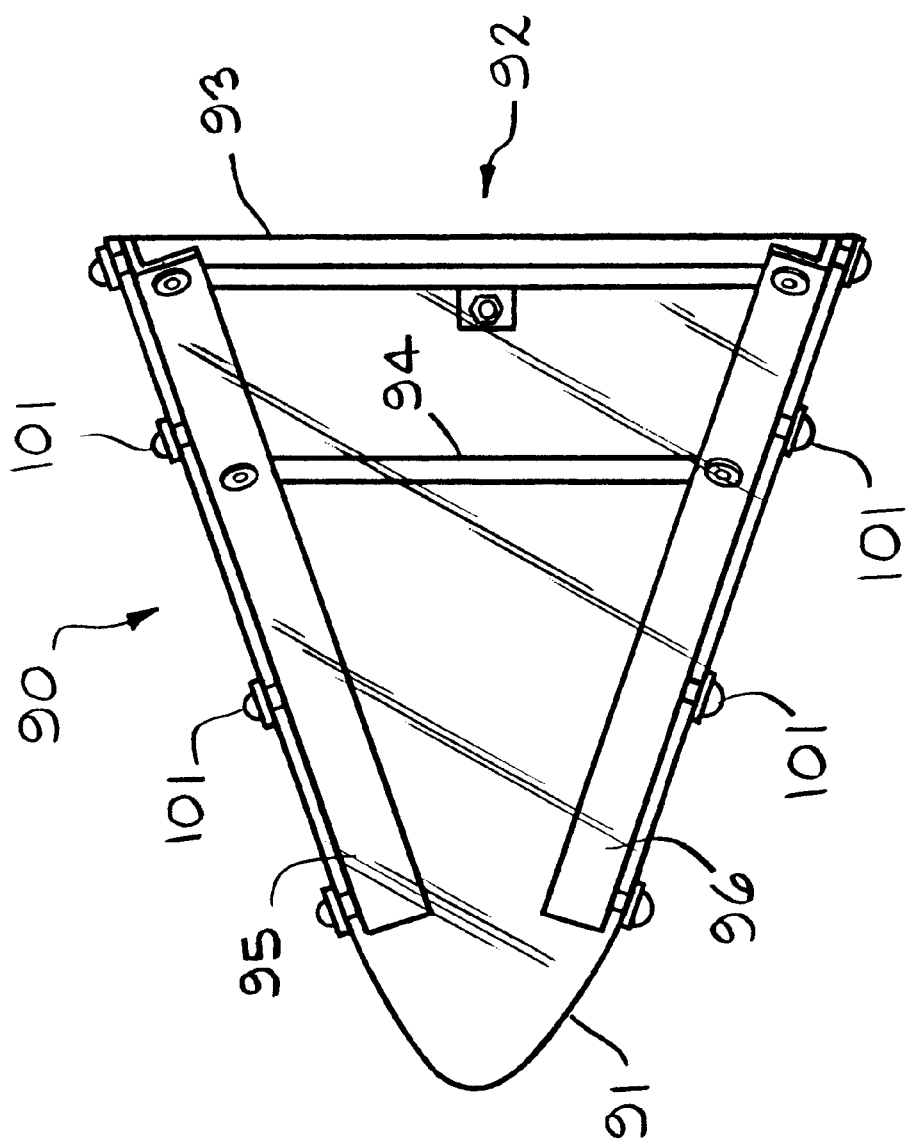
FIG. 26 is a schematic top view of the aerodynamic fairing assembly shown in FIG. 24.

As shown in the schematic top view of FIG. 26, the flexible semi-rigid plastic sheet 91 is wrapped around the support frame assembly 92. The semi-rigid flexible sheet 91 is fixedly maintained in its wrap-around position by being secured to the support members 95 and 96, respectively as shown.

Figure 27:
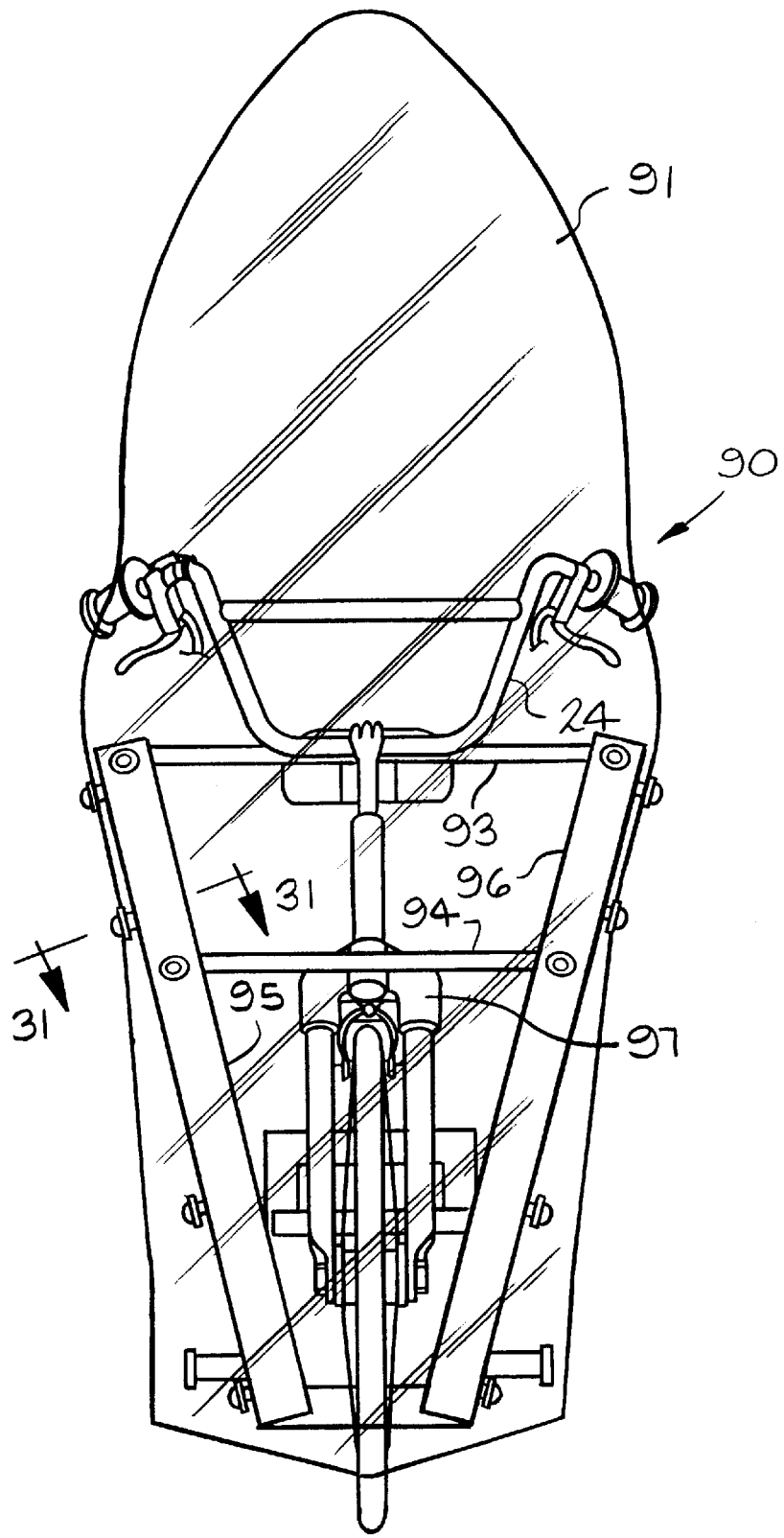
FIG. 27 is a schematic front view of the electric bicycle with the aerodynamic fairing assembly mounted thereon.

As shown in the schematic front view of FIG. 27, the aerodynamic fairing assembly 90 is shown in its operative use position mounted on the electric bicycle.

Figure 28:
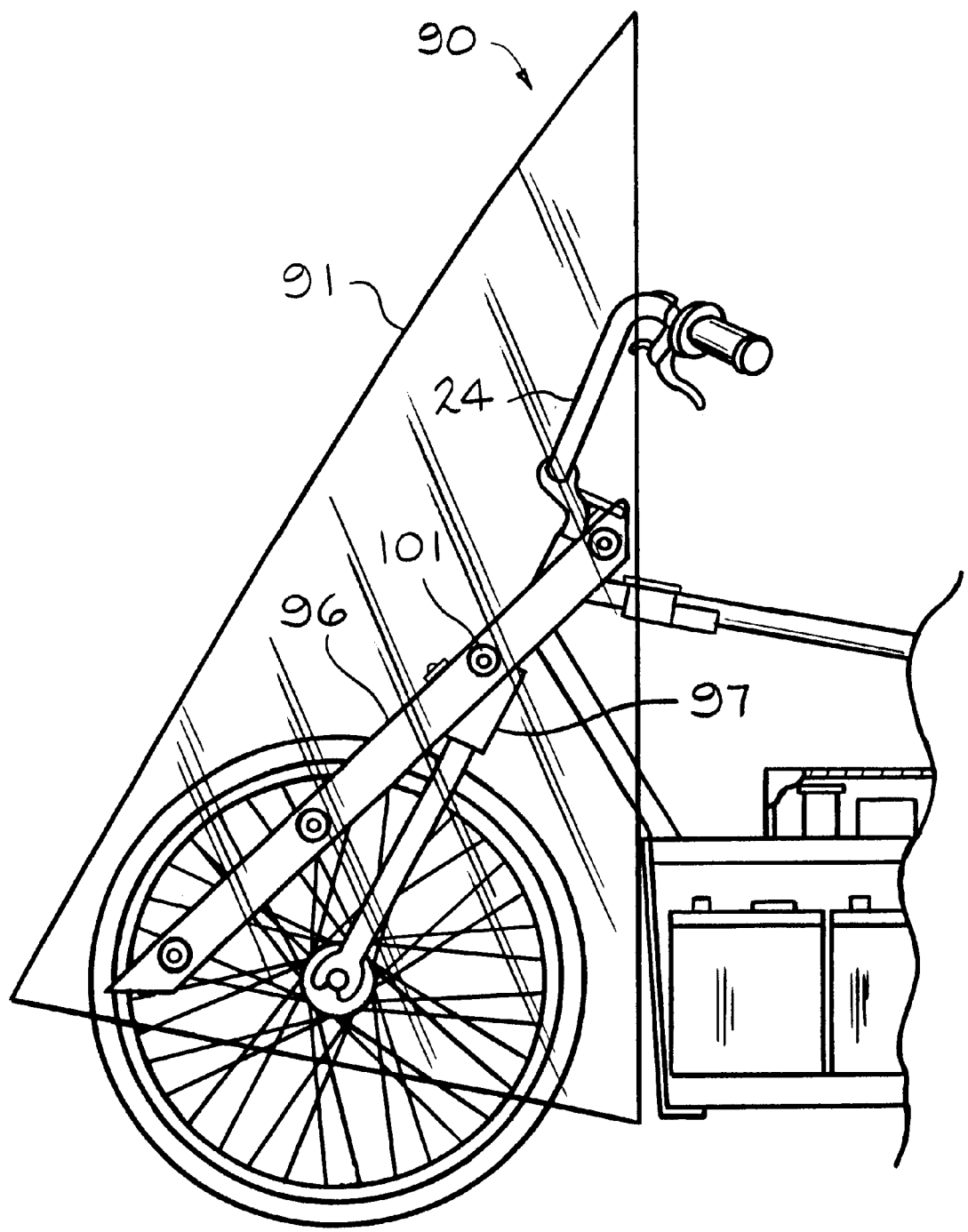
FIG. 28 is a partial schematic side view of the electric bicycle with the aerodynamic fairing assembly mounted thereon.

As shown in the schematic partial side view of FIG. 28, the aerodynamic fairing assembly 90 is shown in its operative use position on the electric bicycle.

Figure 29:
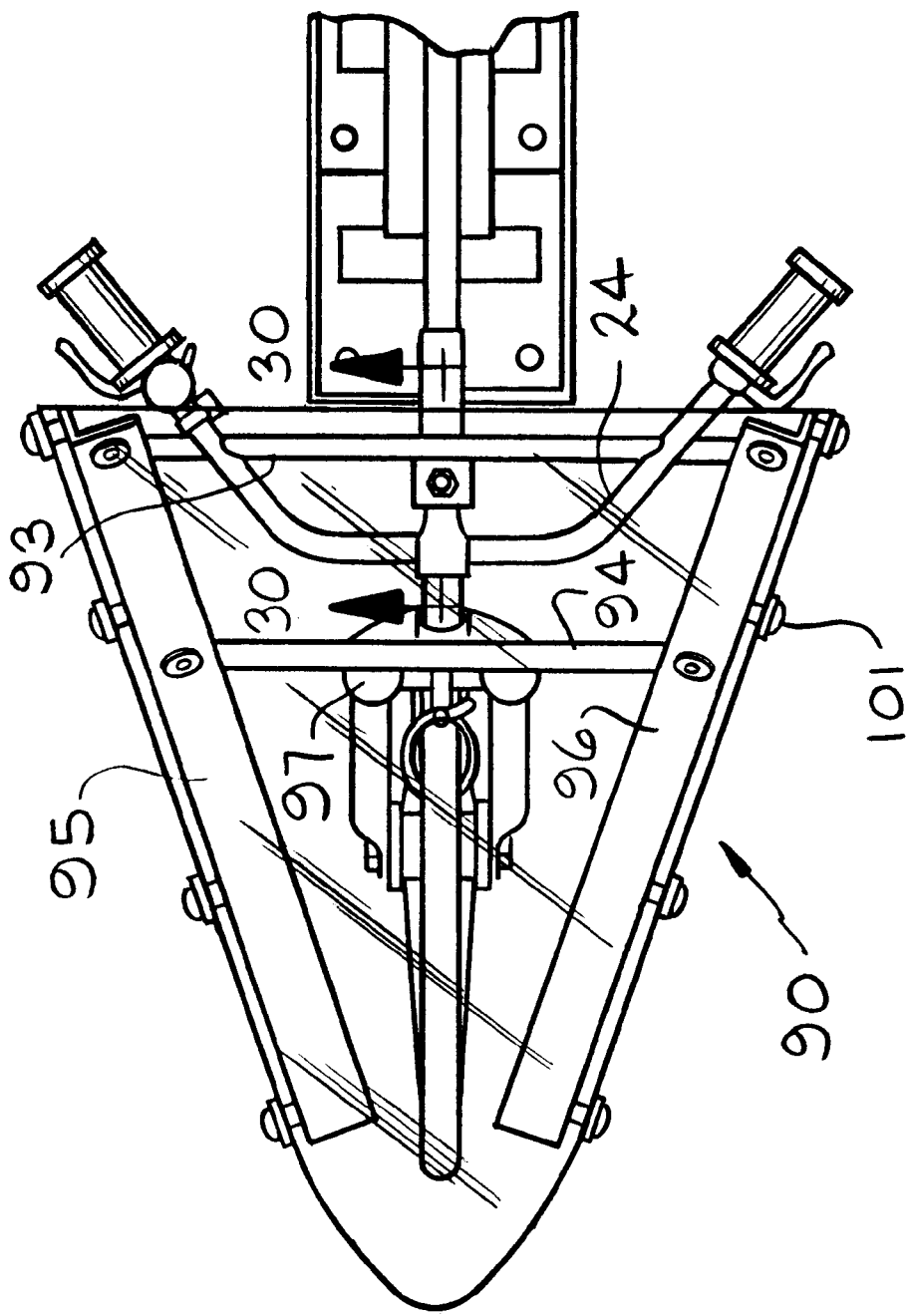
FIG. 29 is a partial schematic top view of the electric bicycle with the aerodynamic fairing assemlby mounted thereon.

As shown in the schematic partial top view of FIG. 29, the aerodynamic fairing assembly 90 is mounted on the electric bicycle. The horizontally oriented lower support strut 94 is positioned so as to rest upon the upper portion of the fork assembly 97.

Figure 30:
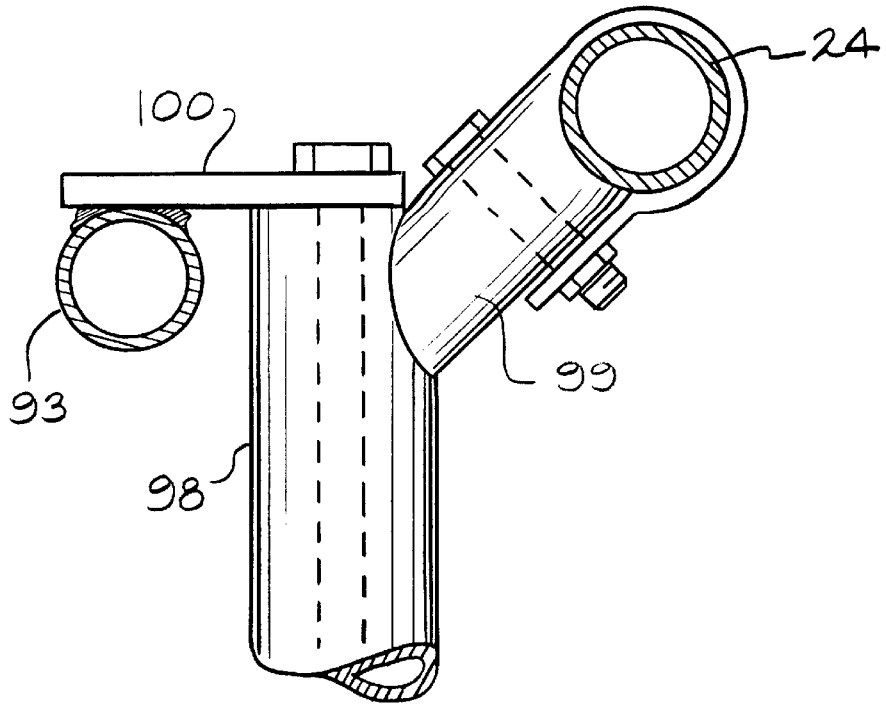
FIG. 30 is a partial schematic side view of the electric bicycle steering assembly with the aerodynamic fairing assembly attached thereto.

As shown in the schematic partial side view of FIG. 30, the steering post assembly 98 is provided with an upwardly and forwardly extending goose-neck extension 99 which is adapted to engage the handle bar 24. A rearwardly extending support plate 100 is fixedly mounted on the horizontal top of the steering post 98 so as to supportably fixedly engage the upper fairing support strut 93 of the aerodynamic support frame 92 therebelow.

Figures 31, 32:
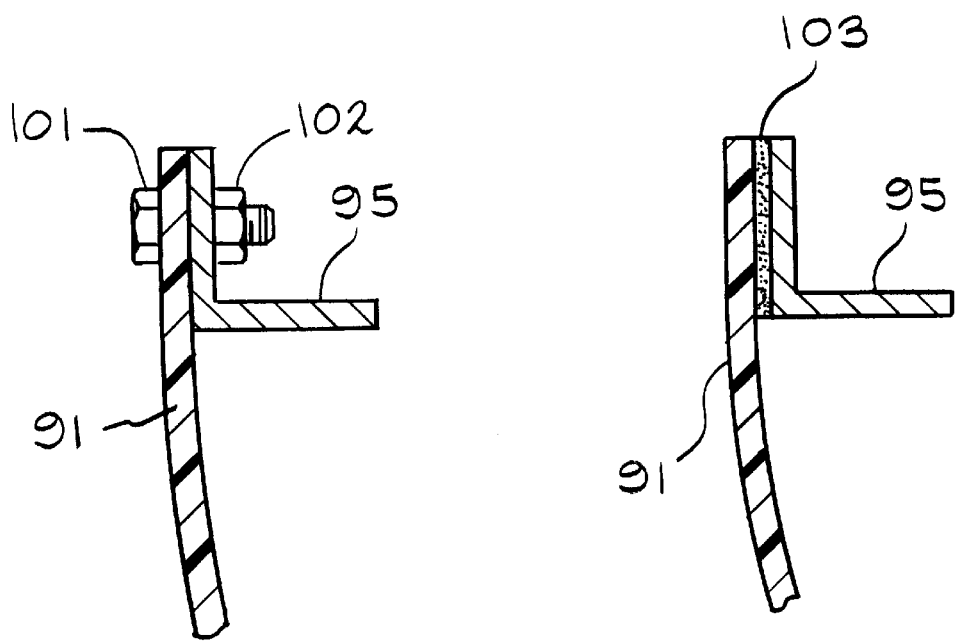
FIG. 31 is a partial schematic sectional view taken on line 31—31 of FIG. 27.
FIG. 32 is a partial schematic view showing an alternate structure for attaching the flexible plastic aerodynamic sheet to the support member of the aerodynamic fairing assembly.

As shown in the partial schematic cross-sectional view of FIG. 31, the flexible plastic surface 91 is fixedly attached to the support members 95 and 96, respectively, by use of nut and bolt members 101 and 102. FIG. 32 shows an alternate means of attachment by use of a selected adhesive material 103.

Figure 33:
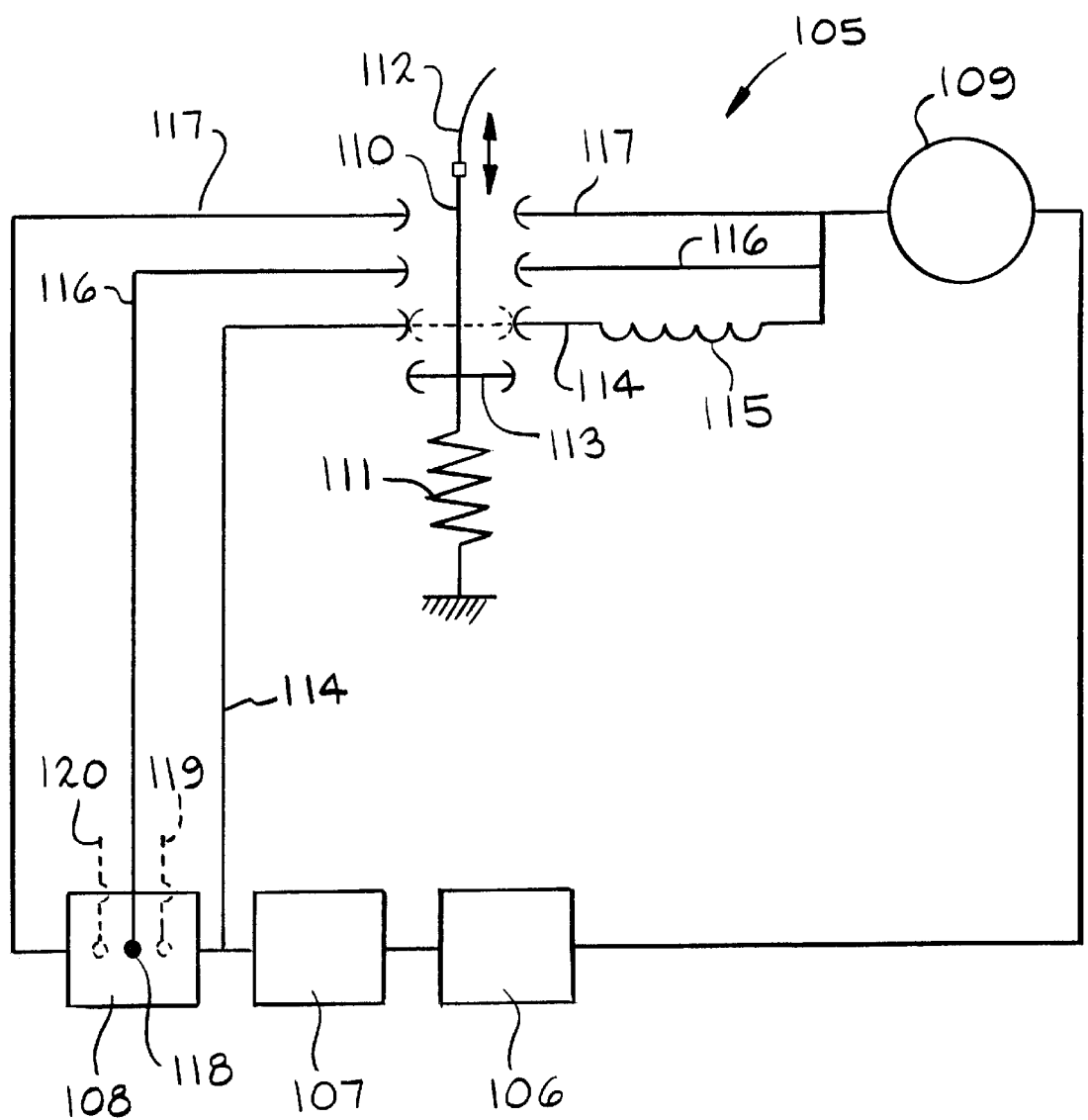
FIG. 33 is a schematic circuit diagram showing a mechanically actuated multi-stage power control switch utilized in another embodiment of the electric bicycle invention.

Another embodiment of the electric bicycle assembly includes a mechanically actuated multi-stage power control switch assembly so as to selectively provide a start circuit and two or more power control levels as desired. This mechanically actuated power control switch assembly is shown in FIG. 33 which is significantly different than the electronically controlled circuit shown in FIG. 23.

As will be hereinafter described, the mechanically actuated power control switch assembly 105 in its single power control embodiment replaces two solenoids and a one-time delay relay with resultant savings in manufacturing costs due to the use of a simpler structure.

Further, in its various multi-stage control switch embodiments, additional costs are avoided with an enhanced versatility in use.

Thus, this simplicity results in added savings in the manufacture of such mechanical control systems.

Further, additional savings are achieved in its operational use which are brought about by less battery drain in the operation of the mechanical control systems as opposed to the previously described electronic circuit control systems which involve solenoids and time delay relays.

Thus the use of the mechanical switch assembly provides a more versatile multiple-stage power level control or multiple-voltage selection control system at a lower cost in manufacture and greater range through less drain on the batteries.

More specifically, the schematic diagram of FIG. 33 shows the mechanically actuated, multi-stage power control switch assembly 105. The 12-volt batteries 106, 107 and 108 are operationally connected to the drive motor 109.

The multi-stage power control switch assembly 105 is comprised of a control closure contact support member 110 which is spring loaded by the spring 111. The contact support member 110 is actuated by a throttle control actuating cable 112 so as to selectively move the closure contact member 113 into operational engagement with each circuit beginning with the start circuit 114 in response to actuation of the throttle (not shown) and the throttle control cable 112 attached. The start circuit 114 may be selectively provided with an induction coil 115, if needed. After the bicycle has started, the throttle is actuated to move the closure contact member 113 upwardly into closure with the low power circuit 116. As the bicycle increases its speed, the throttle can be actuated so as to move the closure contact member 113 into closure with the high power circuit 117 as desired. As shown, the 30-volt power level is achieved through use of a center tap 118 on battery 108. Great versatility in power levels can be achieved by providing additional battery taps 119 and 120, respectively, as desired.

It is understood that the configuration of the closure contact member 113 can be changed as desired to achieve a more efficient shape so as to facilitate the manufacture and assembly of the overall control switch assembly 105.

It is also within the scope of this invention that the multi-speed rear wheel hub assembly also be configured to constitute a coaster multi-speed rear hub drive or a direct geared rear hub drive.

The advantage of having a coaster multi-speed rear hub drive is that when the start-run button is released, the bike continues to coast for extended distances while consuming no power or making no sound.

The advantage of having a direct geared rear hub is that when the start run button is released, the gear chain and clutch drive assembly continues to turn and the motor continues to spin and can be used to generate electricity back into the batteries. It is within the scope of the invention to design the hub to have the capability of selectively choosing the coaster or solid gear feature.

In addition, the use of the jell cell batteries increases the power storage capacity by 15 to 20 percent over conventional lead acid batteries thereby extending range by similar amounts.

Further, it would be possible to use nickel-cadmium batteries. Nickel cadmium batteries carry approximately twice the electrical storage capacity per pound than the storage capacity of lead acid batteries thereby producing approximately twice the operating range of the vehicle.

Further, presently there are several other types of batteries in development that would produce as much as four times the power per pound as conventional lead acid batteries thereby creating an operating range as much as four times that of lead acid. It is within the scope of this invention to use such batteries as they are developed.

In summary, the electric bicycle assembly is provided with a bicycle frame having a front wheel and a rear wheel rotatably mounted thereon. A steering assembly is provided on the frame in operative engagement with the front wheel.

A standard multi-speed rear wheel hub assembly is provided in association with the rear wheel.

A tuned centrifugal slip clutch is provided in operative engagement with the rear wheel hub assembly.

A lightweight, high performance DC electric drive motor is provided on the frame in operative engagement with the tuned centrifugal slip clutch so as to selectively drive the rear wheel.

A DC battery assembly is provided on the frame in operative engagement with the DC electric drive motor so as to power the electric bicycle assembly.

A two-stage start-run control circuitry assembly is provided in operative engagement with the DC battery assembly.

A start-run control button is provided on the steering assembly in operative engagement with the two-stage start-run control circuitry assembly so as to selectively drive the electric bicycle assembly.

In this embodiment of the electric bicycle assembly, the DC battery assembly is a 24-volt system.

In this embodiment of the electric bicycle assembly, the DC battery assembly is a 36-volt system.

In this embodiment of the electric bicycle assembly, the DC battery assembly is provided with a battery charger assembly adapted to be plugged into a 110-volt outlet.

In this embodiment of the electric bicycle assembly, the DC battery assembly is provided with a solar panel battery charger assembly.

In yet another embodiment of the electric bicycle assembly, a bicycle frame is provided which has a front wheel and a rear wheel rotatably mounted thereon. A steering assembly is provided on the frame in operative engagement with the front wheel. A standard multi-speed front wheel hub is provided on the front wheel. A tuned centrifugal slip clutch assembly is provided in operative engagement with the front wheel hub assembly.

A lightweight, high performance DC electric drive motor is provided on the frame in operative engagement with the tuned centrifugal slip clutch so as to selectively drive the front wheel. A DC battery assembly is provided on the frame in operative engagement with the DC electric drive motor so as to selectively power the electric bicycle assembly. A two-stage start-run control circuitry assembly is provided in operative engagement in the DC battery assembly. A start-run control button is provided on the steering assembly in operative engagement with the two-stage start-run control circuitry assembly so as to selectively drive the electric bicycle assembly.

In this embodiment of the electric bicycle assembly, the battery assembly comprises a 24-volt system.

In this embodiment of the electric bicycle assembly, the battery assembly comprises a 36-volt system.

In this embodiment of the electric bicycle assembly, the battery assembly is provided with a battery charger assembly which is adapted to be plugged into a 110-volt outlet.

In another embodiment of the electric bicycle assembly, the battery assembly is provided with a solar panel battery charger assembly.

A tuned centrifugal slip clutch assembly adapted for use with an electric vehicle is provided with a battery powered D.C. drive motor having a motor drive shaft and at least one bicycle wheel provided with a multi-speed drive hub.

An outer clutch shell housing is concentrically freely mounted on a motor drive shaft. The clutch shell is provided in fixed operative engagement with a drive chain adapted to selectively actuate the wheel multi-speed hub operatively connected thereto.

An internal tuned centrifugal slip clutch housing assembly is provided within the outer clutch shell housing. The tuned centrifugal slip clutch housing assembly is fixedly keyed to the motor drive shaft so as to selectively rotatably spin therewith. The internal tuned centrifugal slip clutch assembly housing is provided with internally mounted co-acting weights mounted on an adjustable retainer tension spring which can be selectively tuned so as to vary the tension exerted on the weights. The weights are adapted to respond outwardly to the centrifugal force exerted by the spinning of the rotating motor shaft so as to selectively overcome the tension spring to engage the inner surface of the clutch shell to create a direct drive between drive motor and the drive chain.

A variable ratio V-belt drive assembly is provided for use with an electric vehicle which is provided with a battery powered DC drive motor having a motor drive shaft in operative engagement therewith.

The variable ratio V-belt drive assembly is provided with a forward driving pulley assembly having an inner pulley wall half adapted for fixed attachment to an electric motor drive shaft so as to be selectively rotatable therewith but not laterally movable with respect thereto. The forward driving pulley assembly is provided with an outer pulley wall half which is adapted to be keyed to the electric motor drive shaft so as to be rotatable therewith. The outer pulley wall half is in operative register with the inner pulley wall half so as to be selectively movable toward and away therefrom.

An outer driving pulley clutch cover is adapted for fixed engagement with the electric motor drive shaft so as to be rotatable therewith. The outer driving pulley clutch cover is provided with a plurality of cover clutch weight receiving slots in operative register with corresponding outer pulley wall half clutch weight receiving slots provided on the outer surface of the outer pulley wall half.

Centrifugal clutch weights are provided in operative engagement with the cover weight receiving slots and the corresponding outer pulley wall half weight receiving slots. The centrifugal clutch weights are selectively movable outwardly within the corresponding slots so as to selectively move the outward pulley wall half toward and away from the fixed driving inner pulley wall half in response to the centrifugal force exerted on the centrifugal clutch weights.

A rear driven pulley assembly is provided which is adapted for selective operational engagement with a rear wheel axle and hub assembly. The rear driven pulley assembly is positioned in spaced-apart aligned operational longitudinal registry with the forward driving pulley assembly. The rear-driven pulley assembly is provided with an inner-driven pulley wall half adapted for fixed engagement with a rear wheel hub. The rear-driven pulley assembly is provided with a spring biased outer-driven pulley wall half in operative register with the inner-driven pulley wall half so as to be selectively rotatable therewith. The spring biased outer-driven pulley wall half is adapted to be selectively movable laterally away from the inner-driven pulley wall half when actuated by the forward driving pulley wall assembly.

A V-belt is provided in selective operative engagement with the forward driving pulley assembly and the rear-driven pulley assembly so as to selectively vary the driving ratio when the electric vehicle is actuated.

A battery regenerating wheel rotor assembly is provided for use with electric battery powered wheeled vehicles so as to selectively re-charge the vehicle batteries while the vehicle is in operational motion while braking.

The battery regenerating wheel rotor assembly comprises a circular wheel rotor fixedly mounted on a selected wheel of an electrical battery powered wheeled vehicle so as to rotate therewith when the vehicle is in motion. The circular wheel rotor is provided with a plurality of spaced-apart permanent magnets along the outer peripheral edge thereof.

A U-shaped arcuate generating coil holder having a plurality of spaced-apart generating coils provided on each leg of the coil holder. The generating coil holder is selectively positioned in operative engagement relative to the rotor so as to bracket the outer peripheral edge of the rotor so as to position the generating coils in operational spaced-apart register with the permanent magnets so as to selectively create an electrical current when the rotor is rotating while the electric vehicle is braking.

Electrical conveying cable means selectively connected to the generating coils so as to convey the generated electricity to the vehicle batteries so as to charge the batteries while the electrical vehicle is in motion.

The electric bicycle assembly is provided with a two-stage start-run control circuitry assembly which comprises a start circuit, a low power circuit and a high power circuit adapted to selectively deliver variable power from the battery source means to the drive motor. A selectively adjustable variable time delay relay is provided which is adapted to sequentially close the start circuit, the low power circuit and the high power circuit so as to deliver power to the drive motor as required.

A mechanically actuated multi-stage power control switch assembly is provided for use with electric battery powered vehicle so as to provide selective variable power to the vehicle drive motor. The drive motor is operatively connected by circuitry means to a battery power source means so as to selectively drive the drive motor. The circuitry means comprises a start circuit, a low power circuit and a high power circuit adapted to selectively deliver variable power from the battery source means to the drive motor.

A mechanically actuated multi-stage power control switch assembly is provided with a spring biased contact member. The contact member is actuated by a throttle cable so as to selectively sequentially close the start circuit, the low power circuit and the high power circuit so as to deliver power to the drive motor as required.

Various other modifications of the invention may be made without departing from the principle thereof. Each of the modifications is to be considered as included in the hereinafter appended claims, unless these claims, by their language, expressly provide otherwise.

I claim:

1. An electric bicycle assembly comprising:
    a bicycle frame, said frame having a front wheel and a rear wheel rotatably mounted thereon;
    a steering assembly provided on said frame in operative engagement with said front wheel;
    a multi-speed rear wheel hub assembly provided on said rear wheel;
    a tuned centrifugal slip clutch provided in operative engagement with said rear wheel hub assembly;
    a lightweight, high performance DC electric drive motor provided on said frame in operative engagement with said tuned centrifugal slip clutch so as to selectively drive said rear wheel;
    a DC battery assembly provided on said frame in operative engagement with said DC electric drive motor so as to power said electric bicycle assembly;
    a two-stage start-run control circuitry assembly in operative engagement with said DC battery assembly; and
    a start-run control button provided on said steering assembly in operative engagement with said two-stage start-run control circuitry assembly so as to selectively drive said electric bicycle assembly.

2. An electric bicycle assembly of claim 1 wherein said two-stage start-run control circuitry assembly comprises a start circuit, a low power circuit and a high power circuit adapted to selectively deliver variable power from said battery source means to said drive motor; and
    a selectively adjustable variable time delay relay adapted to sequentially close said start circuit, said low power circuit and said high power circuit so as to deliver power to said drive motor as required.

3. An electric bicycle assembly comprising:
    a bicycle frame, said frame having a front wheel and a rear wheel rotatably mounted thereon;
    a steering assembly provided on said frame in operative engagement with said front wheel;
    a multi-speed rear wheel hub assembly provided on said rear wheel;
    a tuned centrifugal slip clutch provided in operative engagement with said rear wheel hub assembly;
    a lightweight, high performance DC electric drive motor provided on said frame in operative engagement with said tuned centrifugal slip clutch so as to selectively drive said rear wheel;
    a DC battery assembly provided on said frame in operative engagement with said DC electric drive motor so as to power said electric bicycle assembly;
    a two-stage start-run control circuitry assembly in operative engagement with said DC battery assembly, said two-stage start-run control circuitry assembly comprising a start circuit, a low power circuit, a high power circuit adapted to selectively deliver variable power from said DC battery assembly to said drive motor;
    a selectively adjustable variable time delay relay adapted to sequentially close said start circuit, said low power circuit and said high power circuit so as to deliver power to said drive motor as required.

4. An electric bicycle assembly of claim 3 wherein the said battery assembly comprises a 24-volt system.

5. An electric bicycle assembly of claim 3, wherein the said battery assembly comprises a 36-volt system.

6. An electric bicycle assembly of claim 3, wherein the said battery assembly is provided with a battery charger assembly adapted to be plugged into a 110-volt outlet.

7. An electric bicycle assembly of claim 3, wherein the said battery assembly is provided with a solar panel battery charger assembly.

8. An electric bicycle assembly of claim 3 wherein said steering assembly is provided with an aerodynamic fairing assembly in operative engagement therewith, said aerodynamic fairing assembly comprising:
    a flexible semi-rigid plastic sheet which is fixedly mounted on a support frame assembly, said support frame assembly selectively mounted on said steering assembly so as to aerodynamically protect said front wheel provided on said bicycle frame.

* * * * *